US009896011B2

(12) United States Patent
Kong et al.

(10) Patent No.: US 9,896,011 B2
(45) Date of Patent: Feb. 20, 2018

(54) FOLDABLE TABLE ASSEMBLY FOR VEHICLES

(71) Applicants: Hyundai Motor Company, Seoul (KR); Kia Motors Corporation, Seoul (KR); Faurecia Trim Korea, Seongnam-si (KR)

(72) Inventors: Byung Seok Kong, Gunpo-si (KR); Gregory Martin, Meru (FR); Bruno Dinant, Meru (FR)

(73) Assignees: Hyundai Motor Company, Seoul (KR); Kia Motors Corporation, Seoul (KR); Faurecia Trim Korea, Seongnam-si (KR)

( * ) Notice: Subject to any disclaimer, the term of this patent is extended or adjusted under 35 U.S.C. 154(b) by 226 days.

(21) Appl. No.: 14/985,022

(22) Filed: Dec. 30, 2015

(65) Prior Publication Data

US 2016/0375810 A1   Dec. 29, 2016

(30) Foreign Application Priority Data

Jun. 26, 2015   (KR) .................. 10-2015-0090921

(51) Int. Cl.
*B60N 3/00* (2006.01)
*B60N 2/46* (2006.01)

(52) U.S. Cl.
CPC .......... *B60N 3/002* (2013.01); *B60N 2/4686* (2013.01)

(58) Field of Classification Search
CPC ...... B60N 3/002; B60N 2/4686; B60N 3/001; A47C 7/70

USPC .................................... 297/144, 145
See application file for complete search history.

(56) References Cited

U.S. PATENT DOCUMENTS

| 3,367,713 A | * | 2/1968 | Krueger | ............... A47C 7/70 297/162 |
| 5,597,199 A | * | 1/1997 | Hoffman | ............... A47C 7/62 297/119 |
| 8,672,400 B2 | * | 3/2014 | Henderson | ............ B60N 3/002 297/160 |

(Continued)

FOREIGN PATENT DOCUMENTS

| DE | 102006044411 A1 | * | 3/2008 | ............ B60N 3/001 |
| JP | 07-031527 A | | 2/1995 | |
| JP | 11-099033 A | | 4/1999 | |

(Continued)

*Primary Examiner* — Milton Nelson, Jr.
(74) *Attorney, Agent, or Firm* — Morgan, Lewis & Bockius LLP

(57) ABSTRACT

A foldable table assembly for vehicles includes a base bracket, a first rotary arm provided with one end connected with the base bracket and elastically rotatable upwards about the end by a first elastic member, a second rotary arm provided with one end hinged to the base bracket and to be rotated in accordance with rotation of the first rotary arm, and a table connected with the other ends of the first and second rotary arms. The table includes base plates hinged to the other ends of the first and second rotary arms, an intermediate support plate connected with the base plate to be rotatable when a bearing member is interposed between the intermediate support plate and the base plate, and table plates connected with the intermediate support plate to be slidably movable when sliding members are interposed between the table plates and the intermediate support plate.

16 Claims, 20 Drawing Sheets

(56) References Cited

U.S. PATENT DOCUMENTS

2002/0003361 A1    1/2002  Duerr et al.

FOREIGN PATENT DOCUMENTS

| JP | 2001-328477 A | 11/2001 |
| JP | 2007-112423 A | 5/2007 |
| JP | 2009-113586 A | 5/2009 |
| JP | 3170562 U | 8/2011 |
| JP | 2013-043502 A | 3/2013 |
| JP | 2015-020526 A | 2/2015 |
| KR | 10-1125337 B1 | 3/2012 |
| KR | 10-2013-0054749 A | 5/2013 |
| KR | 10-1357410 B1 | 2/2014 |

* cited by examiner

FOLDING TO HORIZONTAL POSITION

DEVELOPMENT OF TABLE

FOLDABLE TABLE ASSEMBLY FOR VEHICLES

CROSS-REFERENCE TO RELATED APPLICATION

The present application claims priority of Korean Patent Application Number 10-2015-0090921 filed on Jun. 26, 2015, the entire contents of which are incorporated herein for all purposes by this reference.

BACKGROUND

Technical Field

The present disclosure relates to a foldable table assembly for vehicles. More particularly, it relates to a foldable table assembly for vehicles which is installed on a rear seat console so that a passenger seated on a rear seat may conveniently use the foldable table assembly for vehicles.

Background Art

In general, various convenience devices to provide convenience to a driver and passengers are installed in a vehicle. For example, there are a console box to store various articles, an armrest on which a passenger may put his/her arm, a cup holder to hold a beverage container, such as a can, a bottle or a cup, a glove box located at the position of a crash pad located in front of a passenger's seat next to a driver's seat, and the like.

Further, a tray may be installed on a crash pad instead of a glove box, a separate tray may be installed on a glove box, or a front tray to receive electronic equipment, i.e., smart equipment, such as a smartphone, or multimedia equipment, or other articles may be installed in front of a console box.

Such a console box is a receipt device which is installed in a space between a driver's seat and a passenger's seat next to the driver's seat so as to store documents, articles, tools and the like. In general, a console armrest on which a driver may put his/her arm during driving is installed on the console box.

The console armrest serves to support the driver's elbow so as to assist the driver to drive in a stable posture and simultaneously serves as a lid to cover the receipt (or receiving) space of the console box.

Further, in a luxury vehicle, such as a limousine, in order to maximally provide convenience to a VIP passenger seated on a rear seat, the position of the rear seat, the angle of a rear seat back, the position of a front seat, or the angle of a front seat back may be adjusted so that the passenger may keep a convenient seated state in a wide and comfortable space during driving.

Further, various convenience devices to provide convenience to passengers on a rear seat are provided. For example, a rear seat console may be installed between left and right regions of a rear seat and various convenience devices may be installed on the rear seat console.

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with the prior art and/or other problems, and it is an object of the present invention to provide a foldable table assembly for vehicles which may be convenient to both passengers seated in left and right regions of a vehicle rear seat and allow the passengers seated in the left and right regions to conveniently use peripheral convenience devices, such as switches of an operation panel, without disturbance of a table.

It is another object of the present invention to provide a foldable table assembly for vehicles which has a structure to absorb shock during collision of a vehicle to prevent passengers from being injured.

In one aspect, the present invention provides a foldable table assembly for vehicles including: a base bracket; a first rotary arm provided with one end connected with the base bracket to be rotatable, and to be elastically rotated upwards about the end thereof by a first elastic member; a second rotary arm provided with one end hinged to the base bracket and to be rotated in accordance with rotation of the first rotary arm; and a table connected with and supported by the other ends of the first rotary arm and the second rotary arm and having table plates, usage position and direction of which are adjustable by a bearing member and sliding members when the table is popped up to a predetermined height by upward rotation of the first rotary arm and the second rotary arm, wherein the table includes base plates hinged to the other ends of the first rotary arm and the second rotary arm, an intermediate support plate connected with the base plate to be rotatable on the base plates when the bearing member is interposed therebetween, and the table plates connected with the intermediate support plate to be slidably movable on the intermediate support plate when the sliding members are interposed therebetween.

Other aspects and preferred embodiments of the invention are discussed infra.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given herein by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
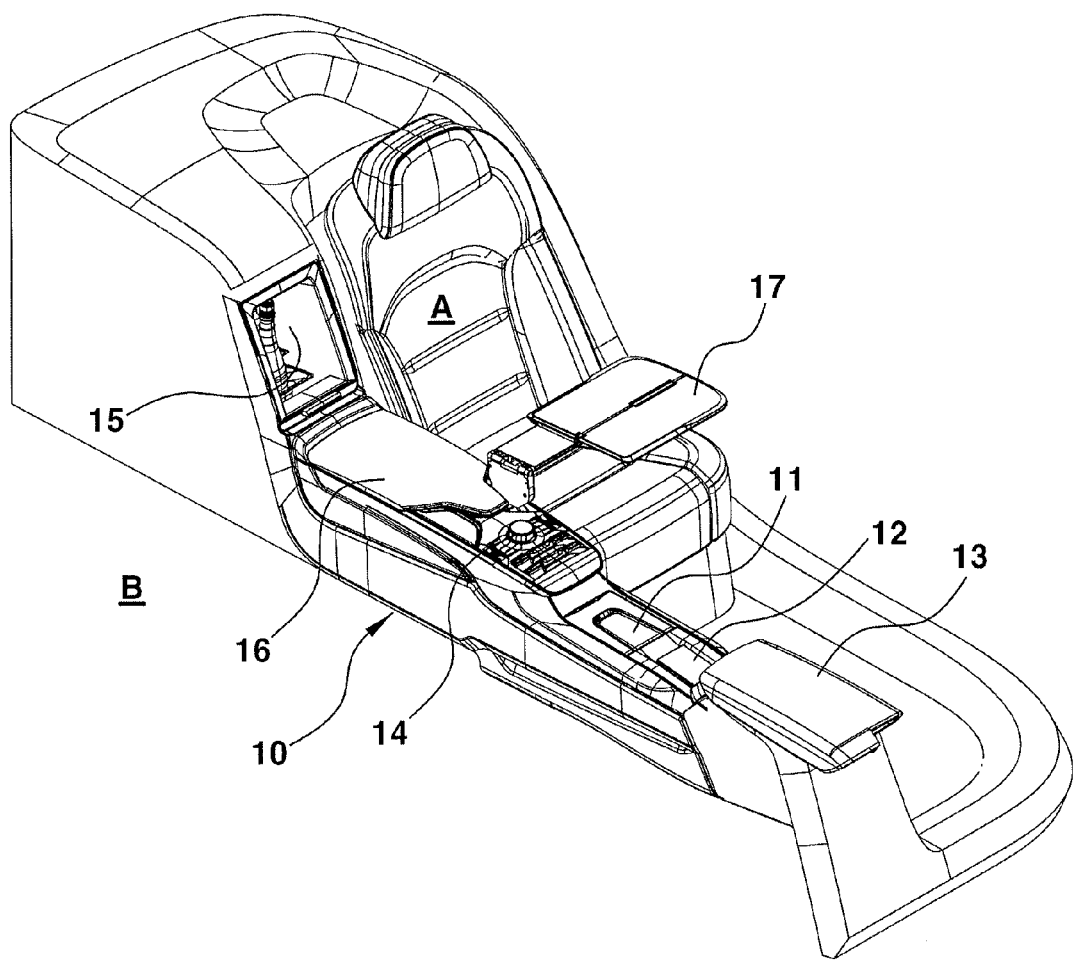
FIG. 1 is a perspective view of a rear seat console for vehicles including a fixed table.

FIG. 1 is a perspective view of a rear seat console for vehicles including a fixed table.

Recently, a rear seat console 10 of a luxury vehicle, as exemplarily shown in FIG. 1, is provided as an assembly having a combination of convenience devices, such as a cup holder 11 to keep beverage container, such as a cup, a tray 12 or a receipt (or receiving) box 13 to store articles, an operation panel 14 to operate devices within a vehicle, such as a display or an air conditioner, a wired/wireless charger, a small refrigerator 15, an armrest 16, and a table 17.

The above rear seat console armrest 16 is installed above a receipt (or receiving) space to store documents, articles, tools and the like and thus also serves as a lid to open and close the receipt (or receiving) space and simultaneously serves to support a passenger's arm.

That is, when the rear seat console armrest 16 is rotated upwards, the receipt (or receiving) space within a console housing may be opened so as to receive articles therein and, in a state in which the receipt (or receiving) space is closed, the rear seat console armrest 16 may be used as an armrest.

In order to achieve luxuriousness and to increase passenger convenience, rear seat consoles, in which an aesthetics sense, such as design, material, color and the like, is considered, have been developed. Further, various convenience devices belonging to rear seat consoles, in which utility, convenience and design are considered, have been developed.

The present invention relates to a rear seat console table. In the fixed rear seat console table, as exemplarily shown in FIG. 1, when the table 17 is in a usable state (i.e., when the table 17 is withdrawn and spread), the position thereof is fixed. Therefore, a passenger seated in an 'A' region may conveniently use the table 17 but it may be inconvenient for a passenger seated in a 13' region to use the table 17.

Further, due to fixation of the position of the table 17, the passenger seated in the 'A' region has poor visibility and accessibility to switches of the operation panel 14.

That is, when the table 17 is used, it is difficult for the passenger seated in the 'A' region to operate switches of the operation panel 14 because the table 17 shields or blocks the view of the operation panel 14 located under the table 17.

Further, the fixed table 17 does not have a shock absorption structure and the passenger's chest may be injured by the table 17 during collision.

Figure 2:
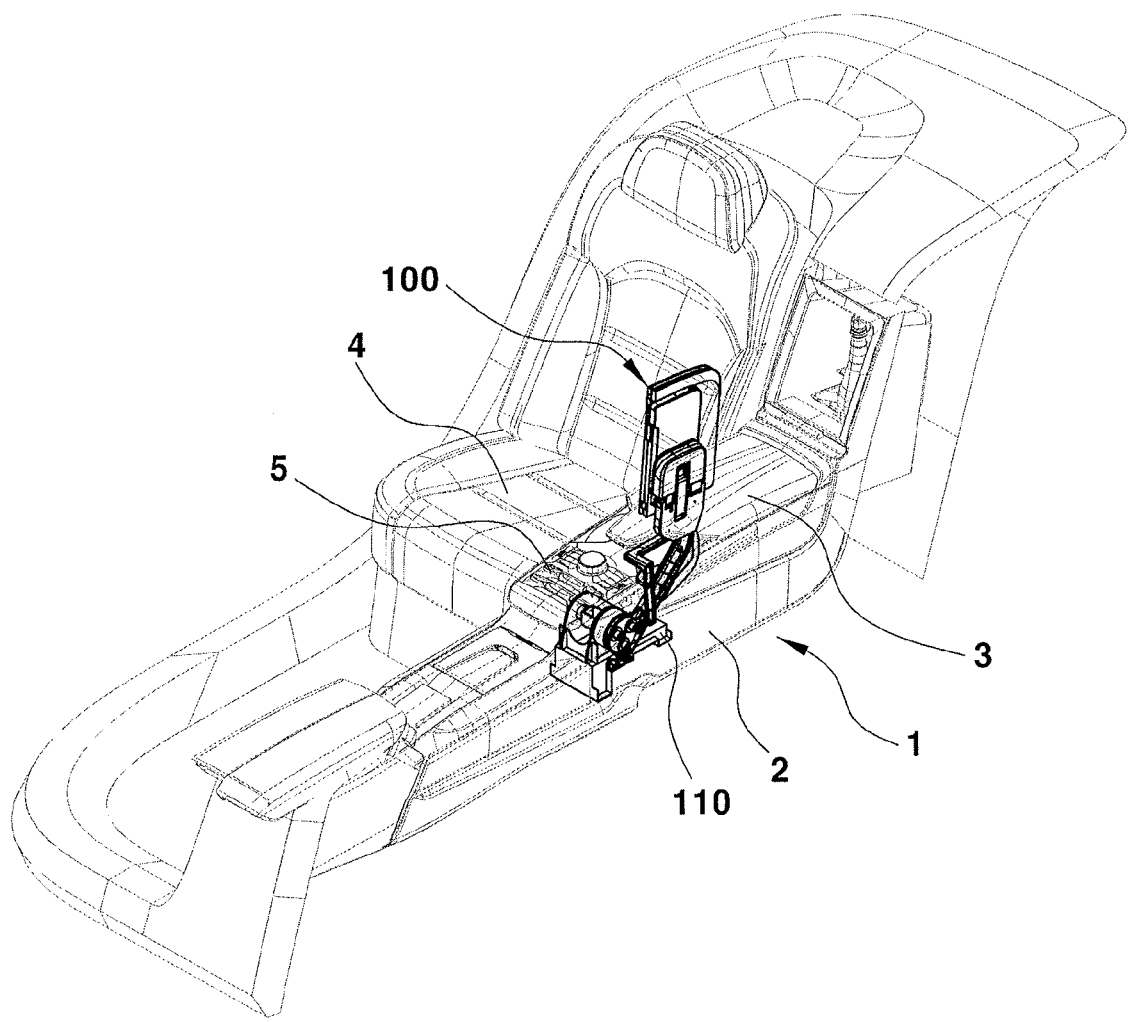
FIG. 2 is a perspective view of a foldable table assembly for vehicles in accordance with an embodiment of the present invention in a mounted state.
Figure 3:
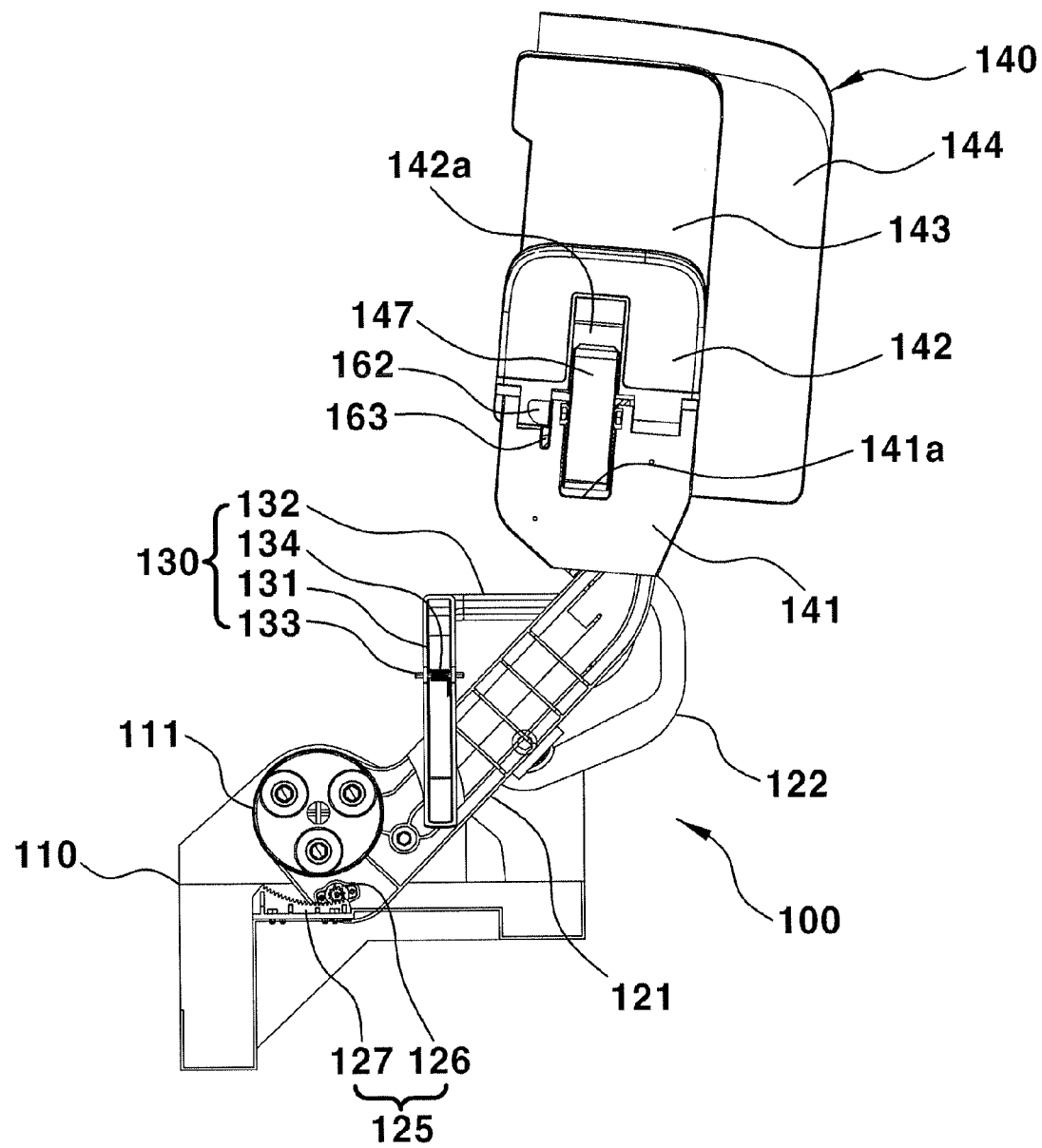
FIG. 3 is a side view of the foldable table assembly for vehicles in accordance with an embodiment of the present invention.
Figure 4A:
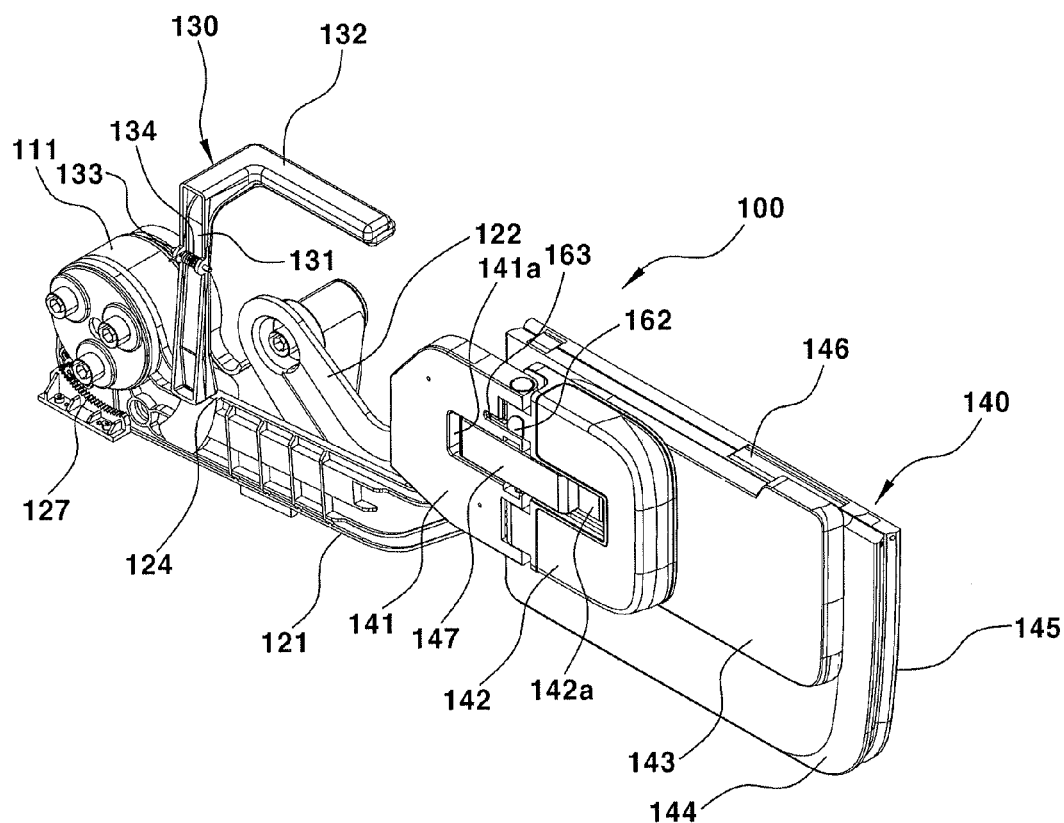
FIG. 4A and FIG. 4B are perspective views illustrating the configuration of the foldable table assembly for vehicles in accordance with an embodiment of the present invention.
Figure 4B:
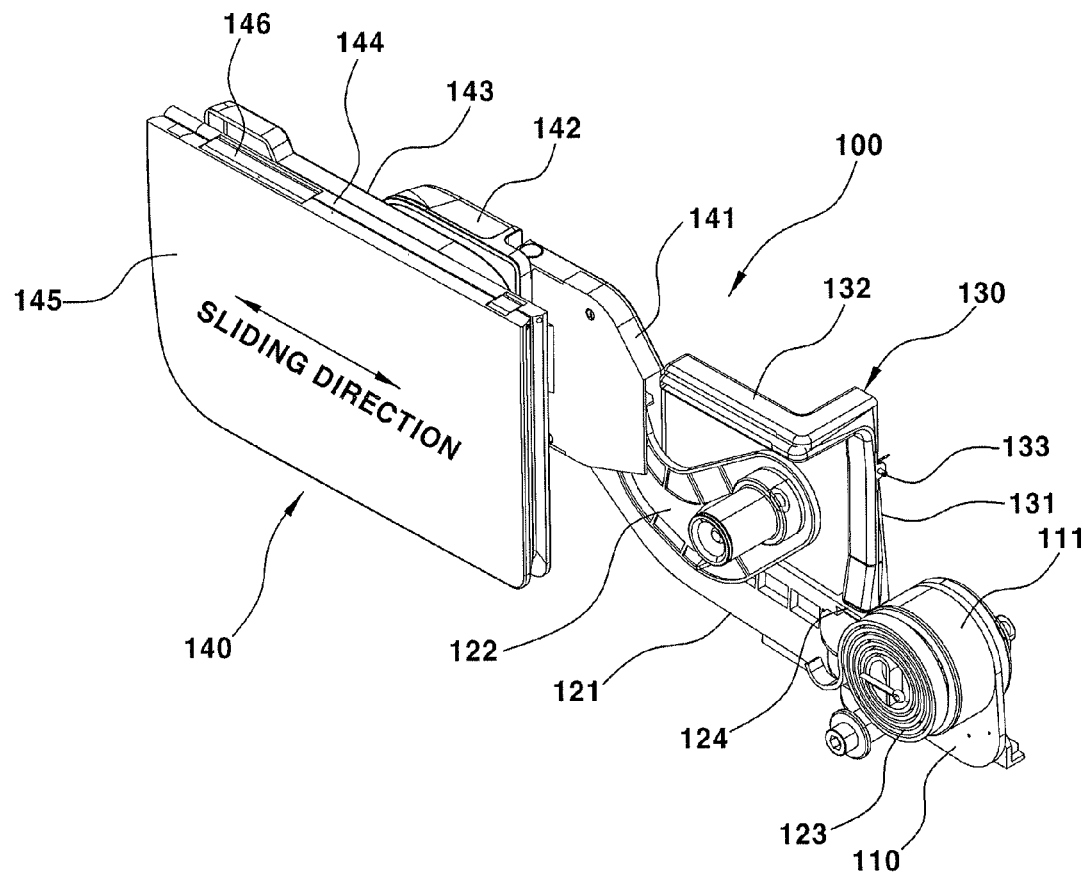

FIG. 2 is a perspective view of a foldable table assembly for vehicles 100 in accordance with an embodiment of the present invention in a mounted state, FIG. 3 is a side view of the foldable table assembly for vehicles 100 in accordance with the embodiment of the present invention, and FIGS. 4A and 4B are perspective views illustrating the configuration of the foldable table assembly for vehicles 100 in accordance with the embodiment of the present invention.

FIG. 3 illustrates a state of the foldable table assembly for vehicles 100 after pop-up of a table 140 and FIGS. 4A and 4B illustrate a state of the foldable table assembly for vehicles 100 in which the table 140 is received in a console housing before pop-up of the table 140.

FIGS. 5A to 5D and 6A to 6D are perspective views illustrating the foldable table assembly for vehicles 100 in accordance with the embodiment of the present invention in an operating state, i.e., illustrating a sequence of development of the table 140 after pop-up of the table 140.

Figure 7:
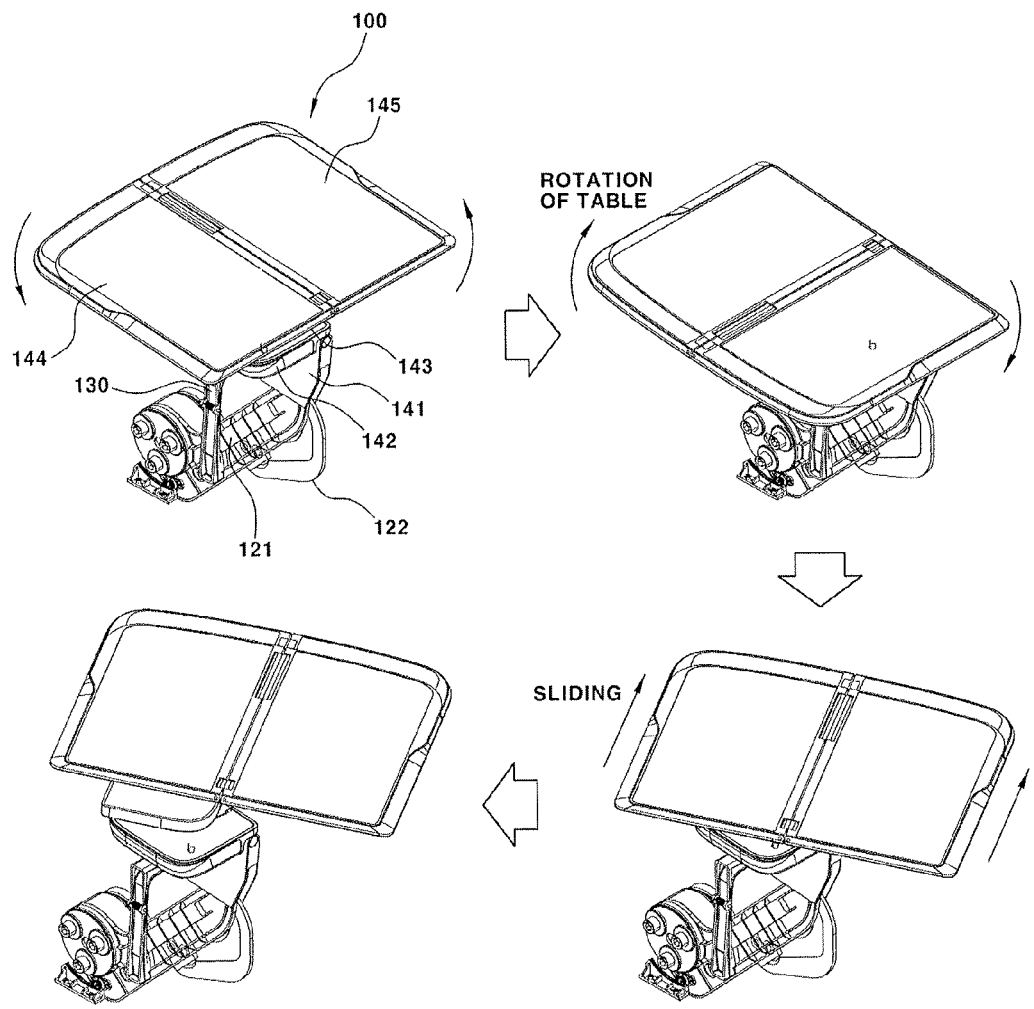
FIG. 7 is a perspective view illustrating adjustment of the position and direction of a table in the foldable table assembly for vehicles in accordance with an embodiment of the present invention.

FIG. 7 is a perspective view illustrating adjustment of the position and direction of the table 140 in the foldable table assembly for vehicles 100 in accordance with the embodiment of the present invention.

Figure 8A:
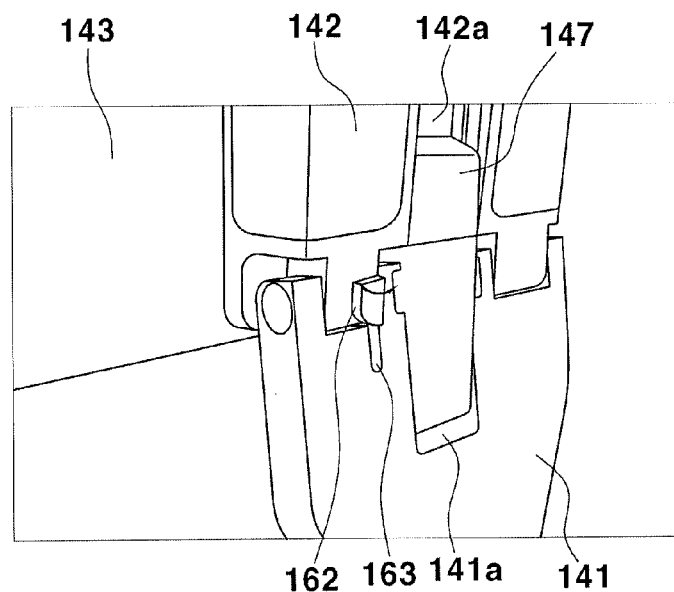
FIG. 8A and FIG. 8B are views illustrating reception of the table in the foldable table assembly for vehicles in accordance with an embodiment of the present invention.
Figure 8B:
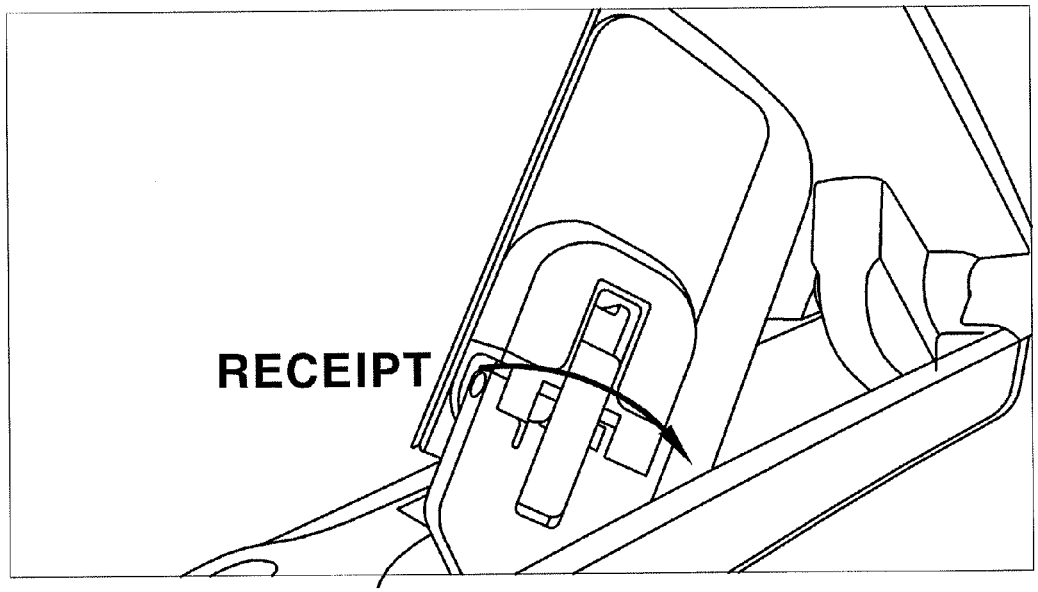
Figure 9A:
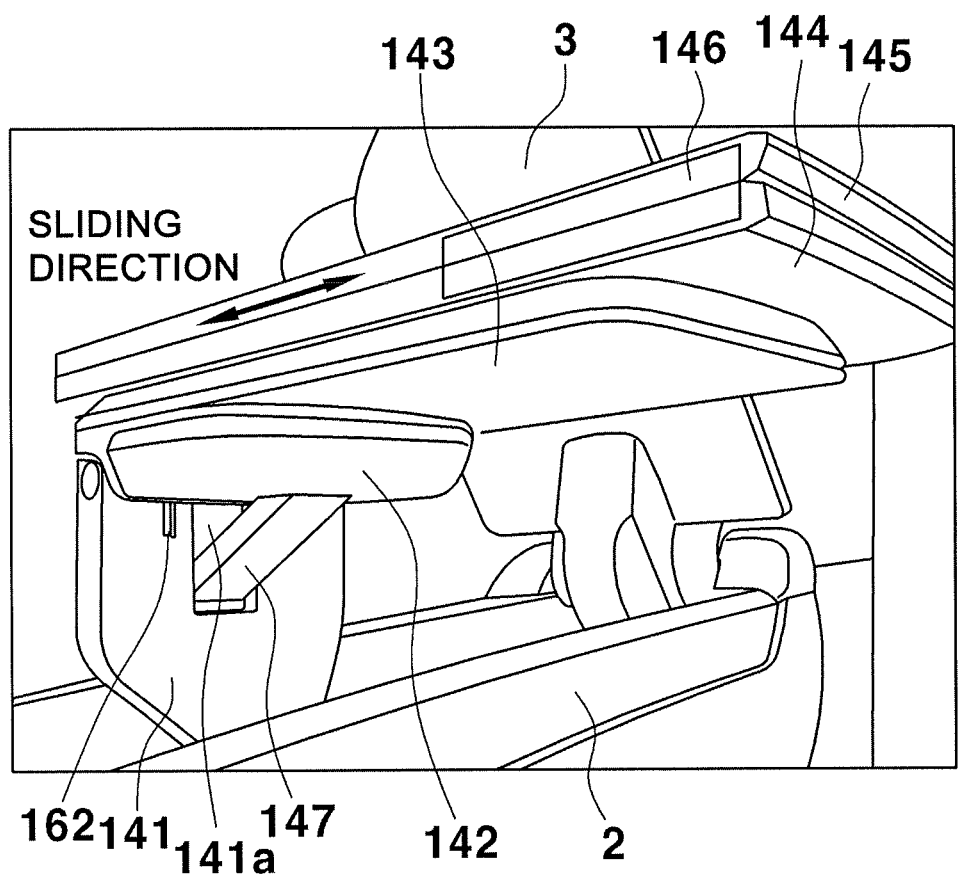
FIG. 9A and FIG. 9B are views illustrating a locking device in the foldable table assembly for vehicles in accordance with an embodiment of the present invention.
Figure 9B:
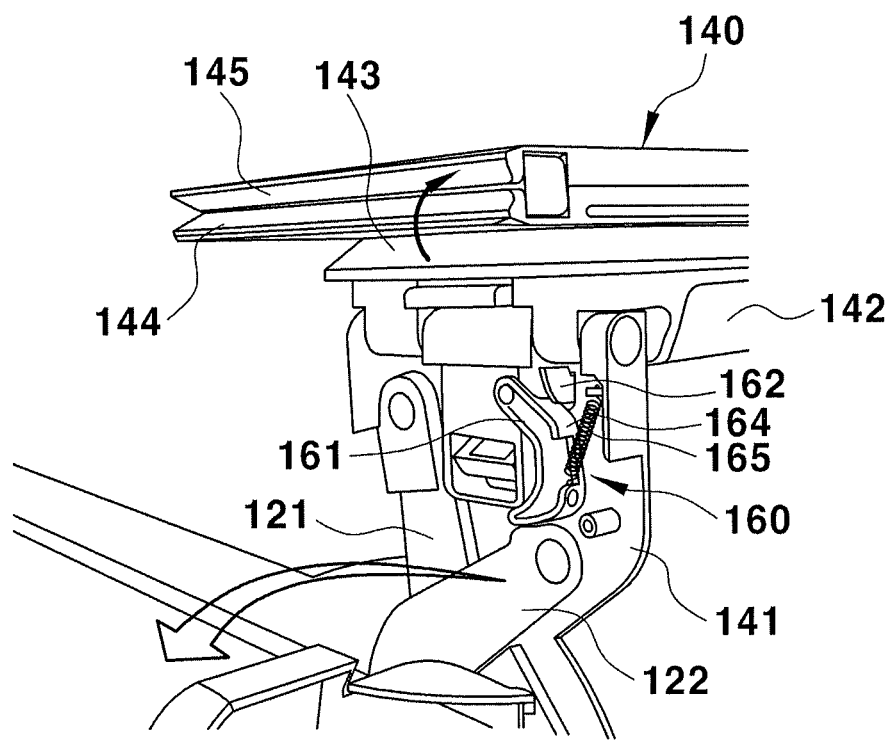

FIGS. 8A and 8B are views illustrating reception of the table 140 by opening a console armrest 3 in the foldable table assembly for vehicles 100 in accordance with the embodiment of the present invention, and FIGS. 9A and 9B are views illustrating a locking device 160 in the foldable table assembly for vehicles 100 in accordance with the embodiment of the present invention.

With reference to FIG. 2, a right region 4 of a rear seat and a rear seat console 1 are illustrated and the rear seat console 1 is installed in a space between the right region 4 and a left region (not shown) of the rear seat.

The rear seat console 1 includes a console housing 2 having a receipt space formed therein and a console armrest 3 located above the receipt space of the console housing 2, serving to open and close the receipt space and providing the function of an armrest, on which a passenger may rest his/her arm, in the closed state of the receipt space.

One end (e.g., the rear end) of the console armrest 3 is hinged to the console housing 2 and thereby, the console armrest 3 is rotated upwards and downwards about a hinge coupling part of the end to open and close the receipt space of the console housing 2.

Further, the foldable table assembly 100, in which the table 140 supported by rotatable arms 121 and 122 is lowered simultaneously with downward rotation of the arms 121 and 122 and thus received within the receipt space of the console housing 2 or is raised from the inside of the receipt space to the outside of the receipt space simultaneously with upward rotation of the arms 121 and 122 and thus is withdrawn from the receipt space, is installed in the rear seat console 1.

FIG. 2 illustrates a state in which the arms 121 and 122 are rotated upwards and the table 140 is withdrawn to the outside of the receipt space of the console housing 2 (i.e., a pop-up state), and the console armrest 3 is closed after withdrawal of the table 140.

FIG. 3 illustrates the state of the table assembly 100 when the table 140 is withdrawn to the same position (i.e., after the table 140 has been popped up).

On the other hand, FIGS. 4A and 4B illustrate the state of the table assembly 100 when the table 140 is received within the receipt space of the console housing 2 and show the positions and angles of the table 140 and the arms 121 and 122 in the received a state.

As described above, if the table 140 of the table assembly 100 of the present invention is not used, the table 140 and the arms 121 and 122 are lowered and received within the receipt space of the console housing 2. Here, in the receipt space, a remaining area, except an area occupied by the table 140 and the arms 121 and 122, may be used as a receipt space to receive articles.

Further, if a user desires to use the table 140, the console armrest 3 is rotated upwards so as to open the receipt space, the table 140 received within the receipt space is withdrawn to the outside and located at a position above the console housing 2, and the console armrest 3 is rotated downwards so as to close the receipt space, as exemplarily shown in FIG. 2. Then, a passenger may use the table 140 while resting his/her arm on the console armrest 3.

Of course, in the state shown in FIGS. 2 and 3, the table 140 is erected vertically or substantially vertically and, thus, in use, the table 140 is laid horizontally or substantially horizontally, as will be described later, and a user may conveniently rotate or slide the table in the horizontal state so as to reach desired position and angle, as will be described later.

That is, if the position and angle (or direction) of the table 140 are adjustable, passengers seated in the left region and the right region 4 of the rear seat may use the table 140 regardless of the positions of the passengers seated in the left region and the right region 4 of the rear seat and use convenience devices, such as switches of the operation panel 5, without interference or obstruction of the table 140.

The configuration of the embodiment will be described with reference to the accompanying drawings. A base bracket 110 to support parts is fixed to the lower region of the inside of the console housing 2 and two arms 121 and 122 to support the table 140 on the base bracket 110 are installed such that designated ends (e.g., lower ends) of the arms 121 and 122 are combined or connected with the base bracket 110 so as to be rotatable and other ends (e.g., upper ends) of the arms 121 and 122 are combined or connected with the table 140 so as to be rotatable.

Further, in a preferred embodiment, the two arms 121 and 122 to support the table 140 may include a first rotary arm 121 provided with one end (e.g., the lower end) combined or connected with one side of the base bracket 110 so as to be rotatable and the other end (e.g., the upper end) hinged to the table 140 and elastically rotated upwards about the end thereof by a first elastic member 123 interposed between the base bracket 110 and the lower end of the first rotary arm 121, and a second rotary arm 122 provided with one end (e.g., the lower end) combined or connected with the other side of the base bracket 110 so as to be rotatable and the other end (e.g., the upper end) hinged to the table 140 and rotated simultaneously with rotation of the first rotary arm 121 while connecting the base bracket 110 and the table 140.

The first elastic member 123 may be a spiral spring installed within a cylindrical housing 111 formed on the base bracket 110. Here, one end of the spiral spring 123 is combined or connected with a spring fixing part of the base bracket 110 and the other end of the spiral spring 123 is fixed to one end of the first rotary arm 121.

The spiral spring 123 is installed so as to provide elastic restoring force to rotate the first rotary arm 121 upwards, i.e., elastic restoring force to rotate the first rotary arm 121 in a direction of withdrawing the table 140 (e.g., the pop-up direction of the table 140).

The spiral spring 123 is used to assist in withdrawing the table 140 and the two arms (e.g., the first and second rotary arms) 121 and 122, which are received in the console housing 2, upwards due to the weights thereof. The elastic restoring force of the spiral spring 123 serves as force simultaneously to raise the table 140 and to rotate the two arms 121 and 122 upwards when the table 140 is withdrawn, i.e., force to achieve the pop-up operation of the table 140 and the arms 121 and 122.

Hereinafter, the pop-up operation means that, in the state in which the table 140 and the two arms 121 and 122 are received in the console housing 2, the two arms 121 and 122 are rotated upwards and the table 140 is moved upwards and protrudes to the outside of the console housing 2 so as to be usable.

The spiral spring, which elastically rotates a long rotary member, such as the first rotary arm 121 in the embodiment of the present invention, about one end thereof with respect to a fixed element, is the same as or similar to those used in the field, and it is known that one end of the spiral spring is combined or connected with the rotary member and the other end of the spiral spring is combined or connected with the fixed element. Therefore, in the description of the embodiment, parts or structures to combine or connect both ends of the spiral spring 123 to the base bracket 110 and the rotary arm 121 may be sufficiently deduced by those skilled in the art and a detailed description thereof will thus be omitted.

The foldable table assembly 100 in accordance with the embodiment of the present invention includes an operating lever 130 which maintains the downward rotated state of the first rotary arm 121 and the second rotary arm 122 so that the first elastic member 123 has elastic restoring force, i.e., the received state of the table 140 and the two arms 121 and 122 in the console housing 2 when the first elastic member 123 is compressed, and is operated by a user (e.g., a passenger on a rear seat) so as to execute the pop-up operation of the table 140.

Such an operating lever 130 serving as an operating unit, which is operated by a user to execute pop-up of the table 140, includes a lever part 131 which is extended in the vertical or substantially vertical direction and hinged to the inner part of the console housing 2 so as to be elastically rotatable, and a push button switch part 132 which is extended horizontally or substantially horizontally from the upper end of the lever part 131 and is configured such that, when the user pushes the push button switch part 132 downwards to execute the pop-up operation of the table 140, the lever part 131 may be rotated.

The central region of the lever part 131 in the vertical or substantially vertical direction may be set as a hinge coupling part 133 with the console housing 2 and a second elastic member 134, which is interposed between the lever part 131 and the console housing 2 and elastically rotates the operating lever 130, is installed at the hinge coupling part 133.

The second elastic member 134 may be a coiled spring mounted at the hinge coupling part 133 of the lever part 131. Here, the coiled spring 134 may be installed such that one end thereof is combined or connected with the lever part 131 and the other end thereof is combined or connected with the console housing 2.

In the embodiment, the operating lever 130 locks the first rotary arm 121 among the two arms 121 and 122 so as to maintain the received state of the table 140 and releases the locked state of the first rotary arm 121 so as to execute the pop-up operation of the table 140 according to user operation. The second elastic member 134 installed at the lever part 131 provides elastic restoring force to rotate the operating lever 130 in a direction of locking the first rotary arm 121.

Further, the lower end of the operating lever 130, i.e., the lower end of the lever part 131, presses the first rotary arm 121 downwards so that the first rotary arm 121 rotated downwards to the table receipt position is not rotated upwards, thus achieving locking of the first rotary arm 121. A latch part 124 which is pressed and locked by the lower end of the operating lever 130 is provided on the first rotary arm 121.

If a user (e.g., a passenger on a rear seat) pushes the push button switch 132 of the operating lever 130 downwards, the operating lever 130 is rotated about the hinge coupling part 133 and the lower end of the operating lever 130 moves in the outward direction and is separated from the latch part 124 of the first rotary arm 121. Accordingly, as the pressing and locking state of the operating lever 130 is released, the first rotary arm 121 is unlocked so as to be rotatable upwards to execute the pop-up operation of the table 140.

On the other hand, after the first rotary arm 121 is rotated downwards within the console housing 2 so as to receive the table 140, the operating lever 130 may be rotated again in the locking direction by the elastic restoring force of the second elastic member 134. Here, the operating lever 130 may be in the state in which the lower end of the operating lever 130 presses again the latch part 124 of the first rotary arm 121 downwards.

When the latch part 124 is locked again by the lower end of the operating lever 130, the locked state of the first rotary arm 121 by the operating lever 130, in which upward rotation of the first rotary arm 121 is restricted by the operating lever 130, is formed.

If the locked state of the first rotary arm 121 by the operating lever 130 is released in the received state of the table 140, the first rotary arm 121 is elastically rotated upwards by the elastic restoring force of the first elastic member 123, as described above, and the second rotary arm 122 is rotated upwards simultaneously with rotation of the first rotary arm 121, thereby executing pop-up of the table 140. Here, it is necessary to slowly rotate the first rotary arm 121 upwards.

That is, the first rotary arm 121 should not be excessively rapidly rotated upwards by the elastic restoring force of the first elastic member 123 and the table 140 should be slowly rotated upwards in the console housing 2.

When the first rotary arm 121 is rotated at an excessively high speed and thus the table 140 is rotated at a high speed, a user may collide with the table 140. In order to solve such a problem, a decelerator 125 to adjust the pop-up velocity of the table 140 may be provided.

The decelerator 125 may include a rotation gear 126 installed on one side surface of the first rotary arm 121 and a guide gear 127 installed on the base bracket 110 and having an arc shape having a predetermined length.

In the engaged state of the rotation gear 126 with the guide gear 127, when the first rotary arm 121 is rotated upwards or downwards, the rotation gear 126 moves along teeth of the guide gear 127. Since, when the first rotary arm 121 is rotated, the rotation gear 126 moves in a state where the rotation gear 126 is engaged with the guide gear 127 of the base bracket 110, the rotational velocity of the first rotary arm 121 may be reduced so that the first rotary arm 121 may be rotated at a proper velocity.

Further, since the first rotary arm 121 is rotated while moving the rotation gear 126 on the first rotary arm 121 in a state where the rotation gear 126 is engaged with the guide gear 127 of the base bracket 110, two gears 126 and 127 serve to hold the first rotary arm 121 on the base bracket 110 so as to be rotated without shaking and the first rotary arm 121 may be more stably operated.

The table 140 includes two base plates 141 and 142 hinged to the other ends (e.g., the upper ends) of the first rotary arm 121 and the second rotary arm 122, an intermediate support plate 143, table plates 144 and 145 on which articles are placed, a bearing member 148 to support the intermediate support plate 143 on the base plate 142 so as to be rotatable, and sliding members 156 to support the table plate 144 on the intermediate support plate 143 so as to be slidably movable.

In more detail, the table 140 includes a first base plate 141 hinged to the upper ends of the two rotary arms 121 and 122 in a state where the first base plate 141 is erected vertically or substantially vertically to the first rotary arm 121 and the second rotary arm 122, a second base plate 142 hinged to the first base plate 141 and rotated with respect to the first base plate 141 so as to be fixed in a perpendicular direction, a rotary intermediate support plate 143 combined or connected with the second base plate 142 in a state where the bearing member 148 is interposed therebetween so as to overlap the second base plate 142 and rotated with respect to the second base plate 142 by the bearing member 148, and the table plates 144 and 145 combined or connected with the intermediate support plate 143 in a state where the sliding members 156 are interposed therebetween and sliding by the sliding members 156.

The first base plate 141 is hinged to the upper ends of the two rotary arms 121 and 122 and is rotatable with respect to the two rotary arms 121 and 122, and the second base plate 142 is hinged to the first base plate 141 and is rotatable with respect to the first base plate 141.

The second base plate 142 may be rotated about a hinge coupling part so as to be disposed almost coplanar with the first base plate 141 or to be disposed in the almost perpendicular direction to the first base plate 141.

That is, the second base plate 142 may be rotated about the hinge coupling part with respect to the first base plate 141 so that, as seen from the side, the first base plate 141 and the second base plate 142 may be disposed in a line at an angle of 180° or approximately 180° (e.g., so as to be coplanar or substantially coplanar) or disposed in a '¬' shape at an angle of 90° or approximately 90°. When the table 140 is received in the console housing 2 or withdrawn (e.g., popped up) from the console housing 2, the two base plates 141 and 142 are disposed in a line to be coplanar and, when the table 140 is developed so as to be used, the second base plate 142 is rotated at an angle of 90° or approximately 90° with respect to the first base plate 141.

In a preferred embodiment, a support member 147 may be provided to support the horizontally laid second base plate 142 on the vertically erected first base plate 141 in the rotated state of the second base plate 142 with respect to the first base plate 141 at the right angle (i.e., after folding of the table 140 to a horizontal or substantially horizontal position, which will be described later).

The support member 147 may be installed within grooves 141a and 142a having a long length in the forward and backward directions, formed on the first base plate 141 and the second base plate 142. One end of the support member 147 is hinged to the inside of the groove 141a of the first base plate 141 such that the position of the end of the support member 147 in the forward and backward directions is fixed and the other end of the support member 147 is hinged to the inside of the groove 142a of the second base plate 142 so as to slide in the forward and backward directions.

Accordingly, as exemplarily shown in FIG. 9A, when the second base plate 142 is rotated and folded with respect to the vertically erected first base plate 141 so as to be laid horizontally, the support member 147 is disposed in an inclined direction and supports the second base plate 142 on the first base plate 141.

On the other hand, as exemplarily shown in FIGS. 3, 4A, 4B, 8A and 8B, if the second base plate 142 is rotated so as to be coplanar with the first base plate 141 and is erected vertically in the same manner as the first base plate 141, the support member 147 is inserted into the grooves 141a and 142a of the first base plate 141 and the second base plate 142.

Further, when the folded table 140 is developed to become a usable state after the first rotary arm 121 and the second rotary arm 122 are rotated upwards and the table 140 is popped up, the table 140 needs to maintain a predetermined height during use.

For this purpose, it is necessary to prevent reverse rotation (e.g., downward rotation) of the first rotary arm 121 and the second rotary arm 122 during use of the table 140.

That is, it is necessary to prevent reverse rotation of the two upwardly rotated arms 121 and 122 in the downward direction during use of the table 140 and therethrough, it is necessary to prevent the table 140 from being lowered from the predetermined height and the usable state of the table 140 should be continuously maintained.

Consequently, the locking device 160 to prevent reverse rotation of the first rotary arm 121 and the second rotary arm 122 after pop-up of the table 140 is necessary and such a locking device 160 may be provided on the table 140.

That is, the table assembly 100 in accordance with the embodiment includes the locking device 160 to restrict rotation of one of the first rotary arm 121 and the second rotary arm 122 which are simultaneously rotated in connection with each other, for example, rotation of the second rotary arm 122, after pop-up of the table 140.

The locking device 160 may be provided on the table 140 so as to lock the second rotary arm 122 in the pop-up state of the table 140. The locking device 160 may automatically lock the second rotary arm 122 in connection with the horizontal folding of the second base plate 142 (i.e., the folding of the table 140 into the horizontal position, which will be described later).

In more detail, the locking device 160 includes a stopper 161 installed on one surface (e.g., the inner surface) of the first base plate 141, to which the upper end of the second rotary arm 122 is hinged, so as to be rotatable and fixing and supporting the upper end of the second rotary arm 122 to prevent reverse rotation of the second rotary arm 122 while the stopper 161 is engaged with the upper end of the second rotary arm 122 rotated upwards to the pop-up position of the table 140.

Further, a locking fin 162 to fix rotation of the stopper 161 fixing and supporting the upper end of the second rotary arm 122 is installed on the second base plate 142 so as to maintain the restricted state of the second rotary arm 122 to prevent reverse rotation of the second rotary arm 122.

The locking fin 162 is installed on the outer surface of the second base plate 142, i.e., the surface of the second base plate 142 opposite to the surface of the first base plate 141 to which the upper ends of the first rotary arm 121 and the second rotary arm 122 are hinged. The locking fin 162 may have a rotatable structure so as to be erected or laid down on the second base plate 142 according to operation.

Further, an insertion hole 163 having a long length is formed on the first base plate 141 such that the erected locking fin 162 in the erected state of the locking fin 162 may pass through the surface of the first base plate 141 on which the stopper 161 is installed when the second base plate 142 is folded.

Accordingly, when the second base plate 142 is folded with respect to the vertically erected first base plate 141 so as to be laid horizontally, the erected locking fin 162 on the second base plate 142 passes through the insertion hole 163 and protrudes from the other surface of the first base plate 141 so as to be locked with the stopper 161 installed on the other surface of the first base plate 141, i.e., the stopper 161 restricting the second rotary arm 122.

Here, the protruding locking fin 162 is locked with a latch part 164 of the stopper 161 and thus fixes the stopper 161 so as not to rotate the stopper 161 in a direction of releasing restriction of the second rotary arm 122. Accordingly, the locking fin 162 restricts the stopper 161 restricting the second rotary arm 122, thereby locking the stopper 161.

In a preferred embodiment, one end of the stopper 161 is hinged to the surface of the first base plate 141 so as to be rotatable, a third elastic member 165 is installed between the other end of the stopper 161 and the first base plate 141, and elastic rotation of the stopper 161 is carried out by the third elastic member 165.

The third elastic member 165 may be a coiled spring installed between the stopper 161 and the first base plate 141 and elastic restoring force of such a third elastic member 165 serves as force to rotate the stopper 161 in a direction of releasing restriction of the second rotary arm 122.

First, locking and unlocking of the rotary arms will be described. When the table 140 received within the console housing 2 is popped up, the first rotary arm 121 and the second rotary arm 122 are rotated upwards and the upper end of the second rotary arm 122 slightly pushes and rotates the stopper 161.

Here, the stopper 161 applies tensile force to the third elastic member 165, i.e., the coiled spring, and is slightly rotated in the clockwise direction in FIGS. 9A and 9B by the second rotary arm 122. As the stopper 161 is rotated in such a manner, tensile force is applied to the coil spring 165.

Then, the entire table 140 including the first base plate 141 and the second base plate 142 may be pulled by the coiled spring 165 and rotated relative to the second rotary arm 122. Thereafter, when rotation of the stopper 161 in the reverse direction is restricted after rotation of the table 140 and the stopper 161, the end of the stopper 161 and the upper end of the second rotary arm 122 may be engaged with each other and the second rotary arm 122 may be in a restricted state.

Restriction of rotation of the stopper 161 in the reverse direction, i.e., locking of the stopper 161, may be carried out by the locking fin 162 during folding of the second base plate 142 (i.e., during folding of the table 140 to the horizontal position). When the second base plate 142 is rotated to be folded horizontally, the locking fin 162 passes through the insertion hole 163 of the first base plate 141 and protrudes from the surface of the first base plate 141 opposite to the surface of the first base plate 141 provided with the stopper 161 located thereon.

The protruding locking fin 162 is locked with the latch part 164 of the stopper 161 and thus fixes the stopper 161 so as not to rotate the stopper 161 in the reverse direction. Accordingly, the locked state of the stopper 161 is achieved by the locking fin 162 locked with the latch part 164.

If the second base plate 142 is erected so as to be coplanar with the first base plate 141, the locking fin 162 is released from the insertion hole 163 of the first base plate 141. Here, since the locking fin 162 is separated from the stopper 161, the locked state of the stopper 161 is released.

In such an unlocked state, when the table 140 is moved downwards so as to be received within the console housing 2, the first rotary arm 121 and the second rotary arm 122 are rotated in the opposite direction to the direction during pop-up (i.e., the first rotary arm 121 and the second rotary arm 122 are rotated downwards).

Then, engagement between the upper end of the second rotary arm 122 and the stopper 161 is released and, thus, the second rotary arm 122 and the stopper 161 may be separately rotated. The stopper 161 is pulled by the third elastic member (e.g., coiled spring) 165 having elastic restoring force and rotated to an initial position thereof.

The intermediate support plate 143 is combined or connected with the second base plate 142 under the condition that the bearing member 148 is interposed therebetween so as to be rotatable on the second base plate 142 which is laid horizontally.

The table plates 144 and 145 are combined or connected with the intermediate support plate 143 while the sliding members 156 are interposed therebetween so as to be slidably movable on the intermediate support plate 143.

The two table plates 144 and 145 may be hinged to each other by a hinge member 146 so as to be foldable and be configured such that the two table plates 144 and 145 are folded to overlap each other when not in use and are unfolded so as to be coplanar with each other in use.

In a preferred embodiment, the table plates 144 and 145 include a first table plate 144 combined or connected with the intermediate support plate 143 while the sliding members 156 are interposed therebetween so as to be slidably movable on the intermediate support plate 143 and a second table plate 145 coupled with the first table plate 144 by the hinge member 146 and rotated about the hinge member 146 to overlap the first table plate 144, i.e., become a folded state or rotated about the hinge member 146 in the opposite direction to be spread coplanar with the first table plate 144, i.e., become a developed state.

Figure 12:
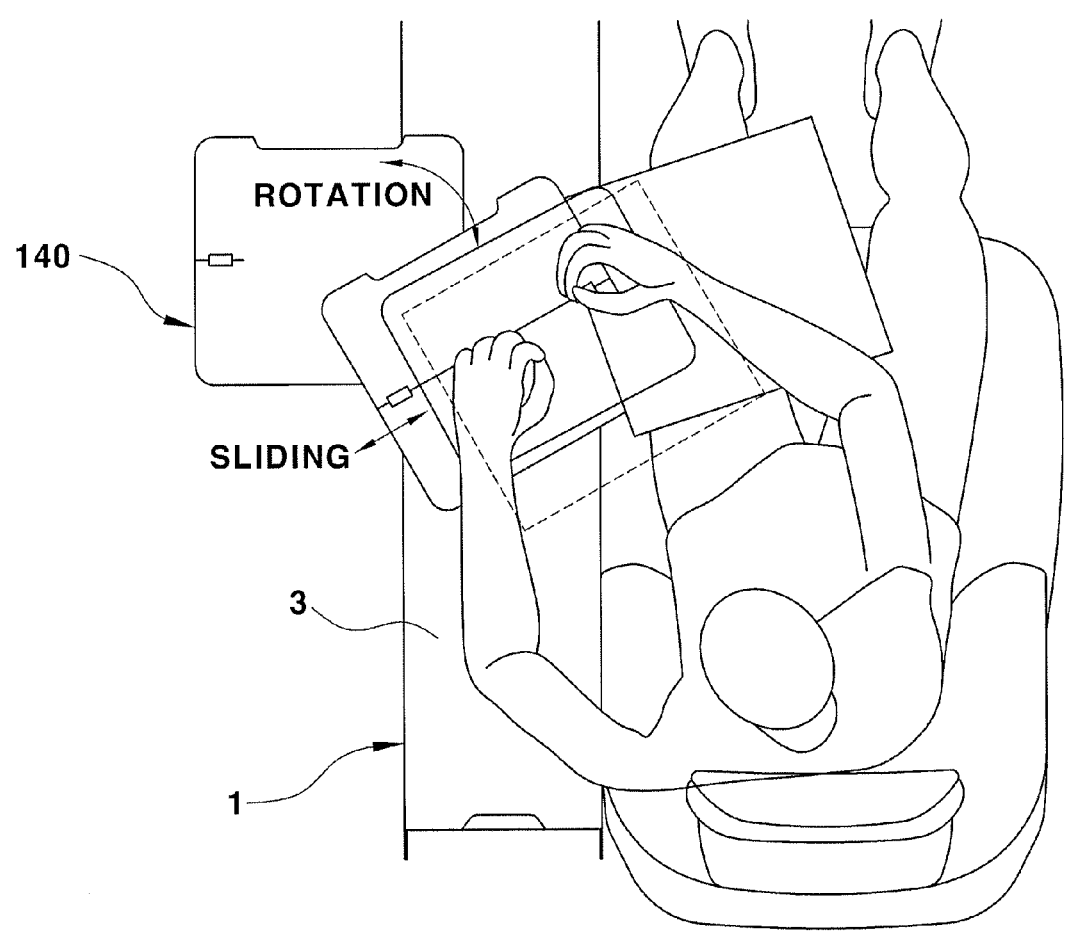
FIG. 12 is a view illustrating adjustment of the position and direction of the table in the foldable table assembly for vehicles in accordance with an embodiment of the present invention.

Accordingly, after folding of the table 140 to the horizontal or substantially horizontal position in which the second base plate 142 is laid horizontally at an angle of 90° or approximately 90° from the vertically erected first base plate 141, when the first table plate 144 is slid to a desired position on the intermediate support plate 143 or the intermediate support plate 143 is rotated in a desired direction on the second base plate 142, the position and angle of the table 140 may be adjusted according to user desires while maintaining the height of the table 140 under the condition that the table 140 is horizontally spread, i.e., the first table plate 144 and the second table plate 145 become coplanar with each other (with reference to FIGS. 7 and 12).

That is, even if a passenger is seated on any one of the left region and the right region 4 of the rear seat, rotation of the intermediate support plate 143 (e.g., rotation of the table 140) and sliding of the first table plate 144 (e.g., horizontal movement of the table 140) are free and, thus, the passenger may adjust the table 140 to a desired position and angle and then use the table 140.

The bearing member 148 facilitating rotation of the intermediate support plate 143 on the second base plate 142 may employ any element to rotate the intermediate support plate 143 serving as a rotary element with respect to the second base plate 142 serving as a fixed element without restriction in embodiments and, for example, employ a general rotary bearing.

Figure 10:
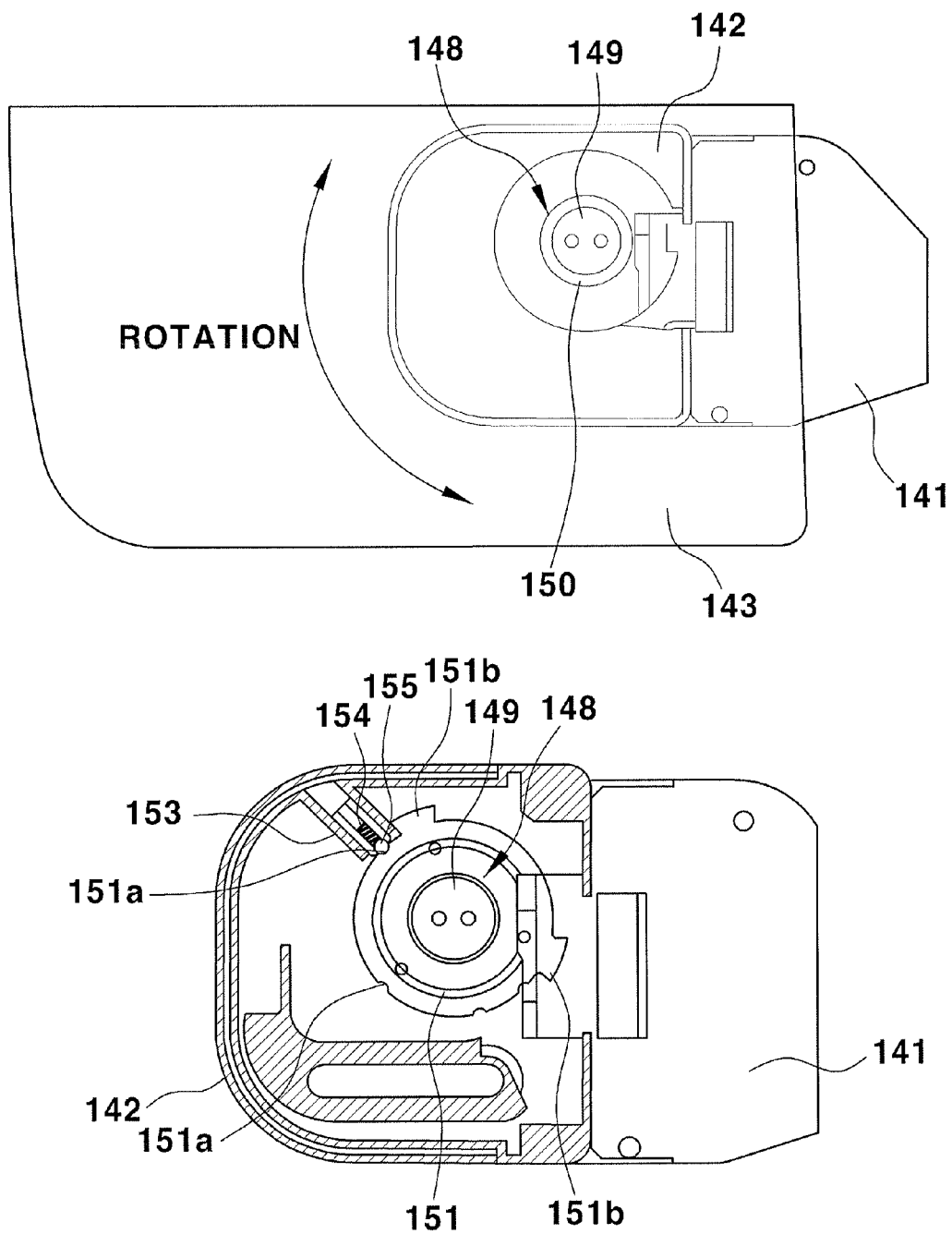
FIG. 10 is a view illustrating a bearing member, a rotation regulation member and a regulation unit in the foldable table assembly for vehicles in accordance with an embodiment of the present invention.
Figure 11:
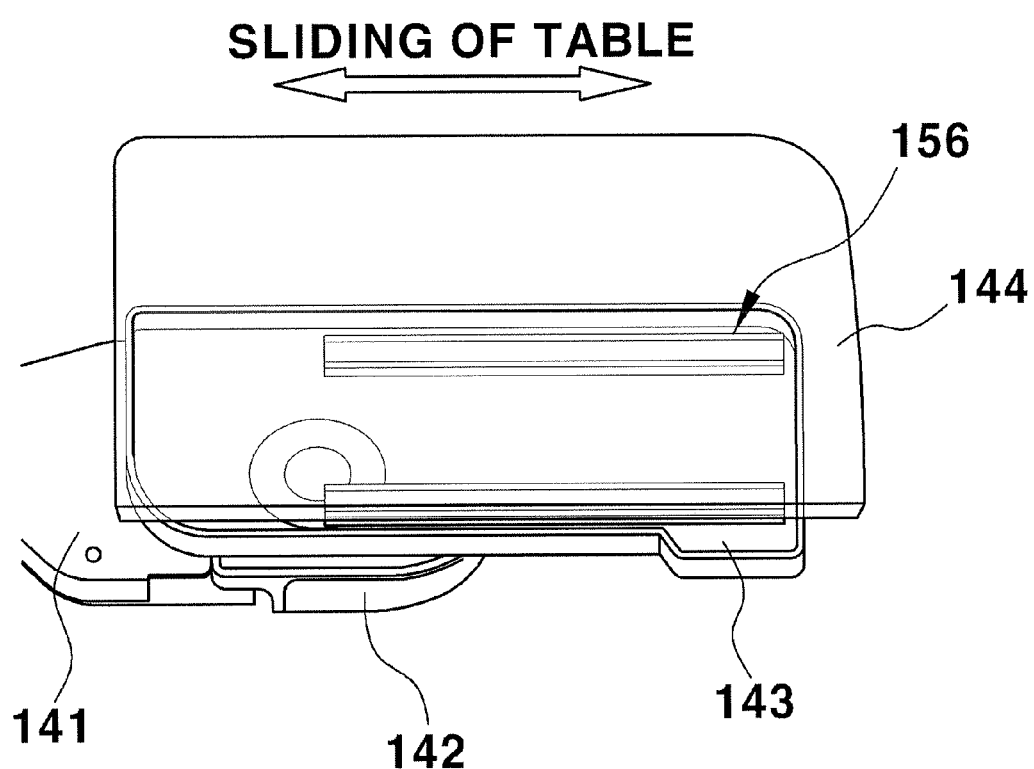
FIG. 11 is a view illustrating sliding members in the foldable table assembly for vehicles in accordance with an embodiment of the present invention.

With reference to FIG. 10, a bearing boss 149 is fixed to the upper surface of the second base plate 142, an outer wheel 150 is fixed to the lower surface of the intermediate support plate 143, and the outer wheel 150 is combined or connected with the bearing boss 149 so as to be rotatable on the outer circumferential surface of the bearing boss 149.

A ball 155 or a cylindrical roller may be interposed between the outer wheel 150 and the boss 149 and thus form a rolling-type rotary bearing in which the outer wheel 150 may be freely rotated with respect to the boss 149 due to rolling of the ball 155 or the cylindrical roller. Instead of the rolling-type rotary bearing, a lubrication-type rotary bearing, in which a lubricating oil or grease is applied between an outer wheel 150 and a boss 149 and the outer wheel 150 may be freely rotated with respect to the boss 149 due to friction reduction, may be employed.

Further, the sliding members 156 to achieve sliding of the first table plate 144 on the intermediate support plate 143 may employ any element to slide the first table plate 144 serving as a movable element with respect to the intermediate support plate 143 serving as a fixed element without restriction in embodiments and, for example, employ a general rail unit.

As one exemplary rail unit, a rail may be installed along a sliding trajectory on one of a fixed element and a movable element, a movable member combined or connected with the rail may be installed on the other thereof, and the movable member may freely slide along the rail while the rail and the movable member are combined or connected.

Here, a rolling unit, such as a roller, may be installed on the movable member so that the movable member may roll along the rail by the rolling unit.

Further, in the bearing member 148 of the embodiment, a rotation regulation plate 151 which is stacked on the outer wheel 150 in the vertical direction and disposed around the bearing boss 149 of the second base plate 142 may be installed on the intermediate support plate 143 so as to be rotated integrally with the intermediate support plate 143.

Here, the rotation regulation plate 151 is combined or connected with a regulation unit 152 of the second base plate 142, and the regulation unit 152 of the second base plate 142 stops the intermediate support plate 143 per predetermined angle through the rotation regulation plate 151 and thus regulates rotation of the intermediate support plate 143.

That is, the intermediate support plate 143 may be stopped whenever the intermediate support plate 143 is rotated by a specific angle and then, only if force of a designated load or more is applied to the intermediate support plate 143 in the stopped state, the stop of the intermediate support plate 143 may be released and the entire table 140 including the intermediate support plate 143 may be rotated again.

If a user desires to rotate again the table 140 to adjust the angle of the table 140 while the table 140 in the stopped state of the intermediate support plate 143 is used (e.g., the table 140 is fixed), the user applies force of the designated load or more to the table 140 to release the stop of the intermediate support plate 143 and then rotates the table 140 including the intermediate support plate 143 to the next stop position (e.g., the table 140 is rotated).

A plurality of stop positions may be set, and the regulation unit 152 of the second base plate 142 may include a ball housing 153 formed at one side of the second base plate 142 and a ball 155 elastically supported by a spring 154 in the ball housing 153 such that the ball 155 may elastically protrude from the ball housing 153.

Here, recesses 151a, into which at least a part of the ball 155 protruding from the ball housing 153 by the elastic restoring force of the spring 154 is inserted, may be formed along the circumference of the rotation regulation plate 151 by predetermined intervals.

In such a configuration, when the table 140 is rotated, the intermediate support plate 143 is rotated and, when the intermediate support plate 143 is rotated integrally with the table 140, the rotation regulation plate 151 is also rotated. While the table 140 is rotated, the ball 155 rolls along the circumference of the rotation regulation plate 151 and, when the ball 155 protrudes from the ball housing 153 by the elastic restoring force of the spring 154 and is inserted into one of the recesses 151a of the rotation regulation plate 151, the rotation regulation plate 151 and the intermediate support plate 143 on which the rotation regulation plate 151 is installed are stopped.

Consequently, when the intermediate support plate 143 is stopped, the entire table 140 is also stopped and, if force of a designated load or more in the rotating direction is applied to the table 140 in the stopped state, the ball 155 is separated from the recess 151a of the rotation regulation plate 151, and the stop of the rotation regulation plate 151, the intermediate support plate 143 and the table 140 is released.

Here, the ball 155 is pressed by the circumference of the rotation regulation plate 151 outside the recesses 151a, compresses the spring 154 and is inserted into the ball housing 153. Then, in the state in which the spring 154 is compressed by the ball 155, the ball 155 moves along the circumference of the rotation regulation plate 151.

Further, when the ball 155 reaches the position of the next recess 151a by rotation of the rotation regulation plate 151, the ball 155 protrudes from the ball housing 153 by the elastic restoring force of the spring 154 and is inserted into the next recess 151a, and the rotation regulation plate 151 is stopped again.

Using the above-described structure in which the intermediate support plate 143 and the entire table 140 are rotated by a predetermined angle and stopped and the table 140 is rotated again by applying force of a designated load or more, rotation of the table 140 in the stopped state may be prevented under the normal used state of the table 140 and the table 140 may be stably used in the stopped state.

Further, since the table 140 is in the stopped state, a passenger may be prevented from being struck by the rotating table 140 during collision.

Moreover, since, if force of a designated load or more is applied to the table 140, the table 140 may be rotated, a passenger may be prevented from being injured by impact caused by collision of the passenger's body with the table 140 and the table 140 may be rotated by the force and absorb the impact.

In a preferred embodiment, protrusions 151b to regulate the maximally rotated position of the table 140 may be formed on the rotation regulation plate 151 and, if such a protrusion 151b contacts the ball housing 153, the protrusion 151b restricts rotation of the rotation regulation plate 151 so that the rotation regulation plate 151 is not rotated any more at the maximally rotated position.

That is, the rotation regulation plate 151 may be rotated up to the position of the protrusion 151b contacting the ball housing 153. When the entire table 140 is rotated until the protrusion 151b of the rotation regulation plate 151 contacts the ball housing 153 of the second base plate 142, the protrusion 151b is caught by the ball housing 153 and the table 140 including the rotation regulation plate 151 and the intermediate support plate 143 is not rotated any more.

In the embodiment, two protrusions 151b which regulate the rotation range of the table 140 to rotate the table 140 within a predetermined range are separated by a predetermined distance in the circumferential direction and protrude from the rotation regulation plate 151.

The configuration of the table assembly 100 in accordance with the embodiment of the present invention has been described above. Hereinafter, the operating state of the table assembly 100 will be described.

First, when not in use, the table 140 is received within the receipt space of the console housing 2. Here, when the console armrest 3 is closed, the table 140 received within the console housing 2 is not visible from the outside.

FIGS. 4A and 4B illustrate the received state of the table 140 within the receipt space of the console housing 2.

Thereafter, if a passenger on the rear seat desires to use the table 140, the passenger rotates the console armrest 3 upwards to open the receipt space of the console housing 2 and then pushes the push button switch 132 of the operating lever 130 downwards.

Accordingly, the operating lever 130 is rotated and the locked state of the first rotary arm 121 is released and, when the locking state of the first rotary arm 121 is released, the first rotary arm 121 is rotated upwards by the elastic restoring force of the first elastic member 123.

Here, passenger's force to pull the table 140 upwards (i.e., force to lift the table 140) may be added to the elastic restoring force of the first elastic member 123, and the pop-up operation of the table 140 may be carried out by such force.

That is, the second rotary arm 122 is rotated upwards simultaneously with upward rotation of the first rotary arm 121 and, thus, the table 140 protrudes upwards from the console housing 2, as exemplarily shown in FIGS. 2, 3, 5A and 6A. Thus, pop-up of the table 140 has been completed.

Here, the first base plate 141 and the second base plate 142 are not folded but are erected so as to be spread coplanar with each other.

Further, as exemplarily shown in FIGS. 3 and 6A to 6D, in the pop-up state of the table 140, the entire table 140 including the first base plate 141 and the second base plate 142 is slightly rotated in the counterclockwise direction with respect to the first rotary arm 122. The reason for this is that the first base plate 141 and the second base plate 142 are rotated at a small angle relative to the first rotary arm 121 and the second rotary arm 122 by rotation of the stopper 161 engaged with the upper end of the second rotary arm 122 and the pulling force of the second elastic member 134.

In such a manner, in the pop-up state, the first rotary arm 121 is inclined in the oblique direction but the first base plate 141 and the second base plate 142 are erected upright without inclination in the sideward direction.

At this time, the first table plate 144 and the second table plate 145 are folded so as to overlap each other.

Further, the locking fin 162 installed on the second base plate 142 is located at a position at which the locking fin 162 may be inserted into the insertion hole 163 formed on the first base plate 141 when the second base plate 142 is folded.

Figure 5A:
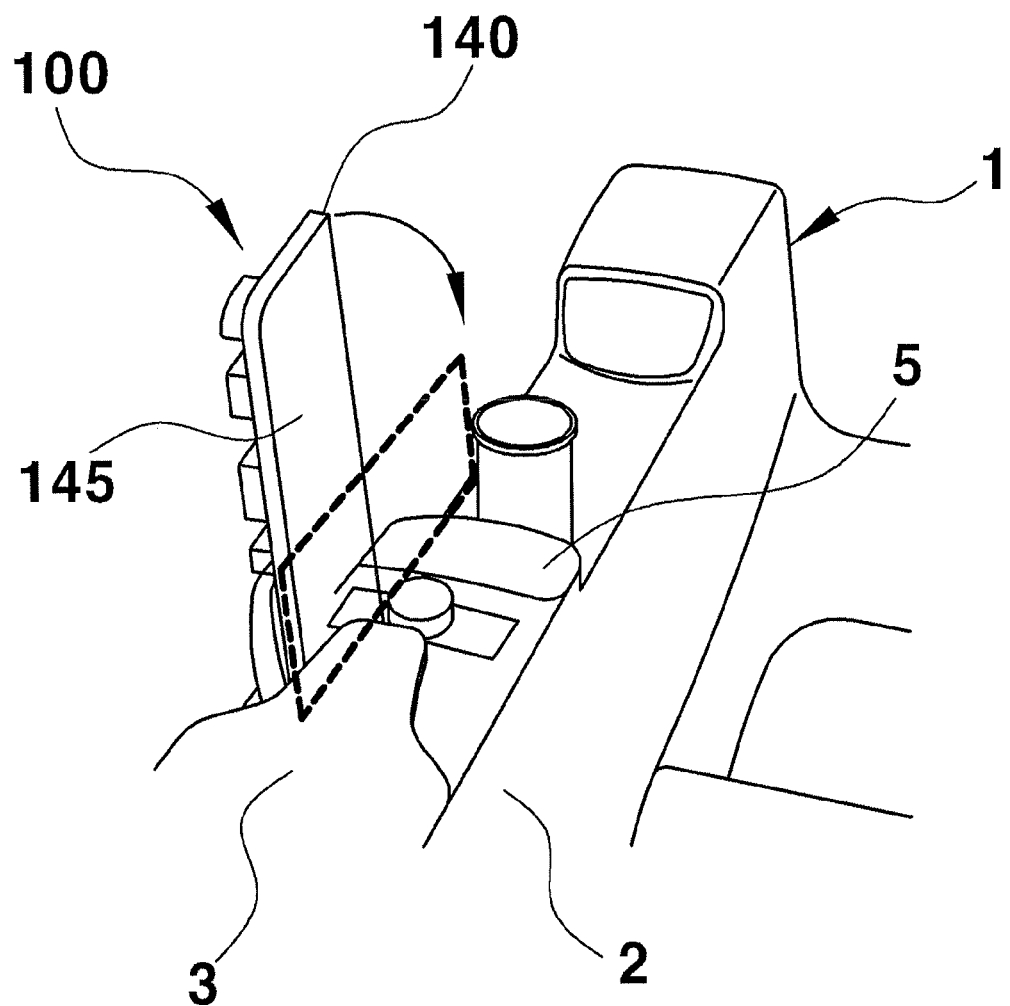
FIG. 5A, FIG. 5B, FIG. 5C and FIG. 5D and FIG. 6A, FIG. 6B, FIG. 6C and FIG. 6D are perspective views illustrating the foldable table assembly for vehicles in accordance with an embodiment of the present invention in an operating state.
Figure 5B:
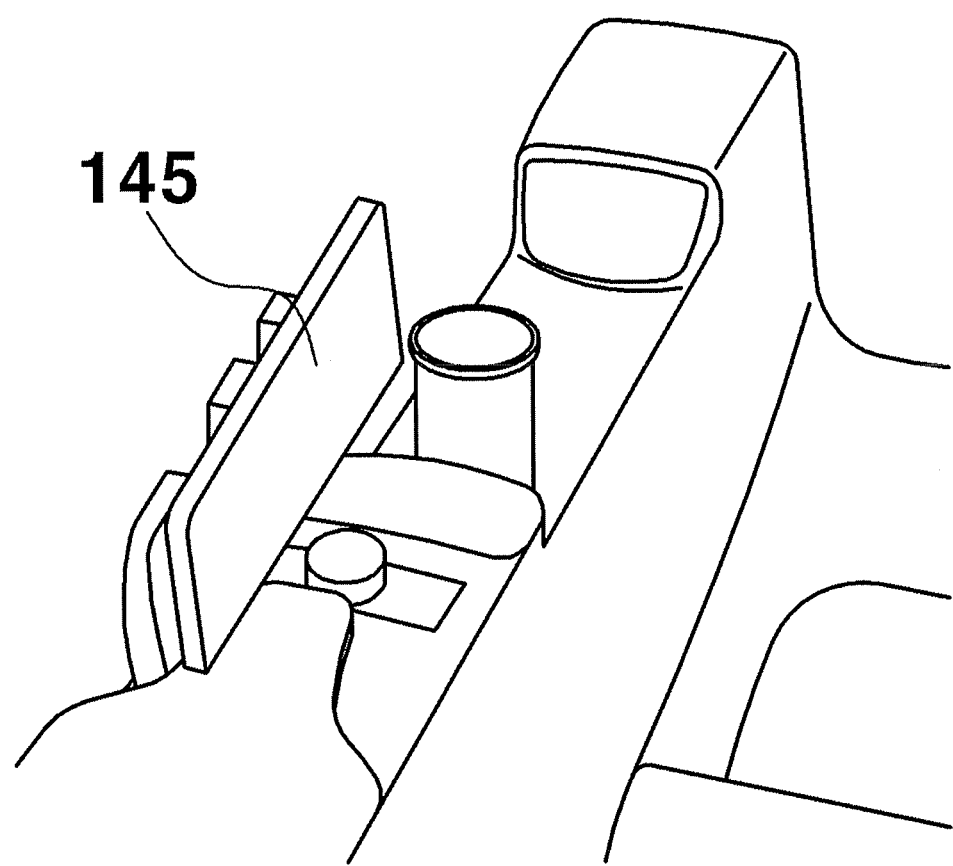
Figure 5C:
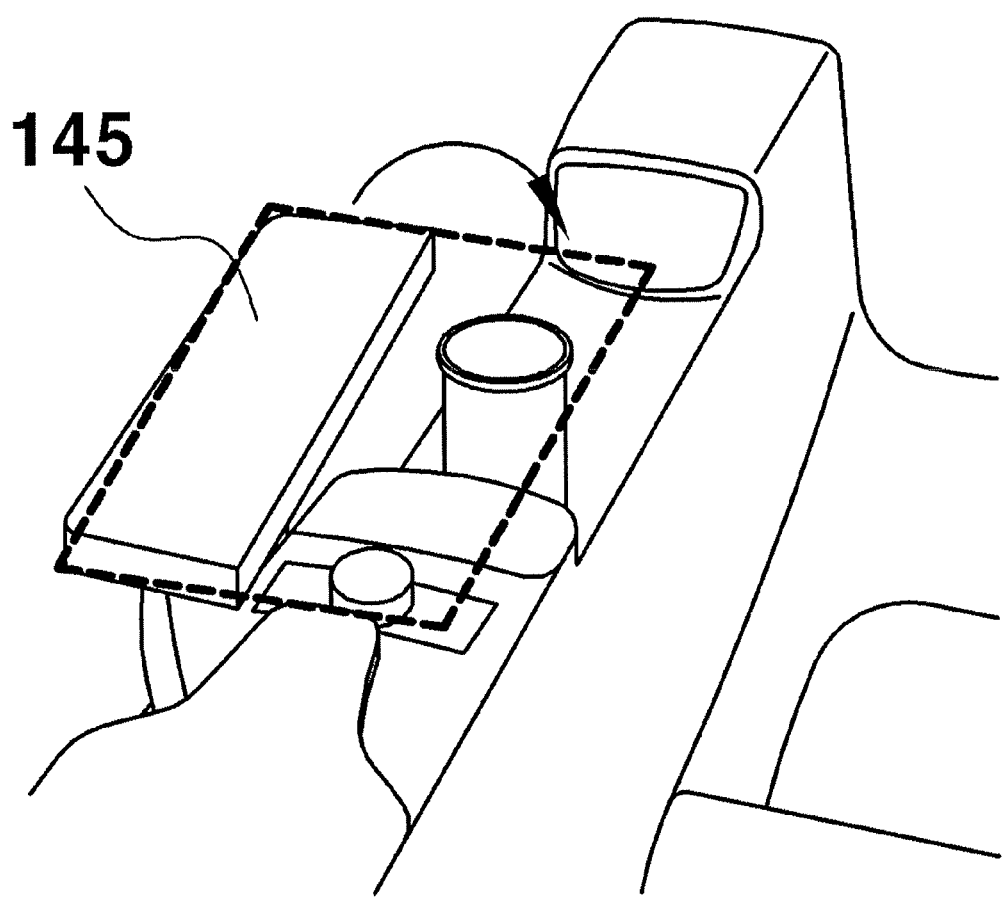
Figure 5D:
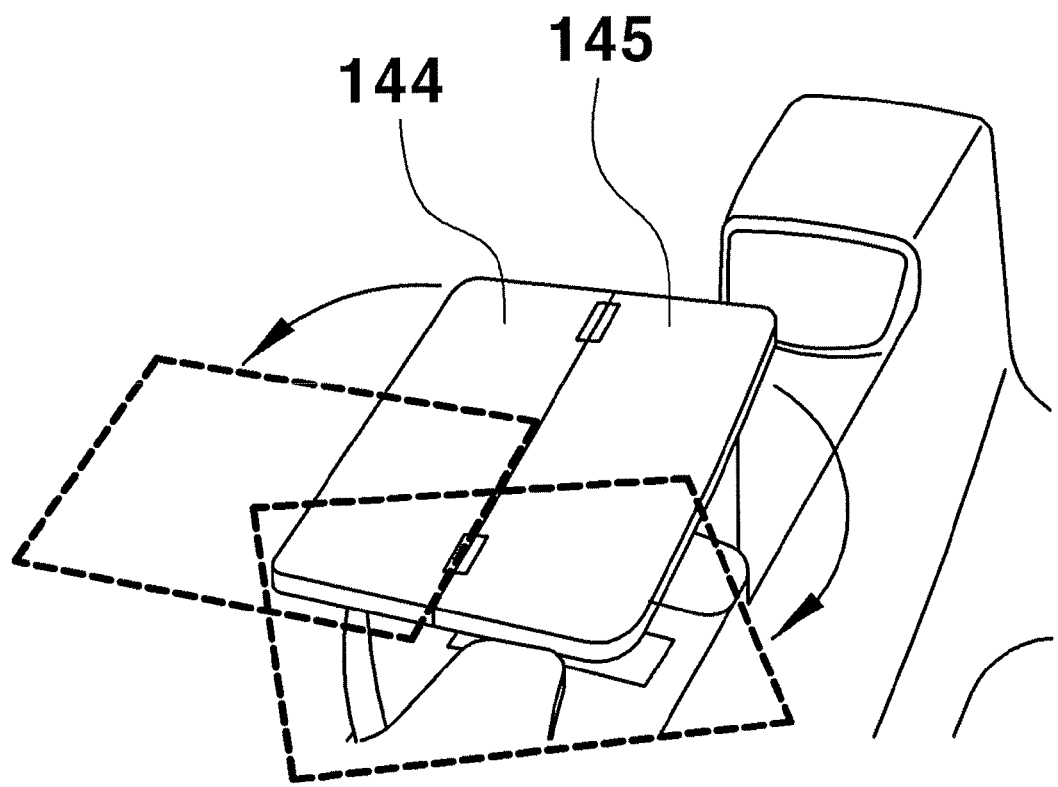
Figure 6A:
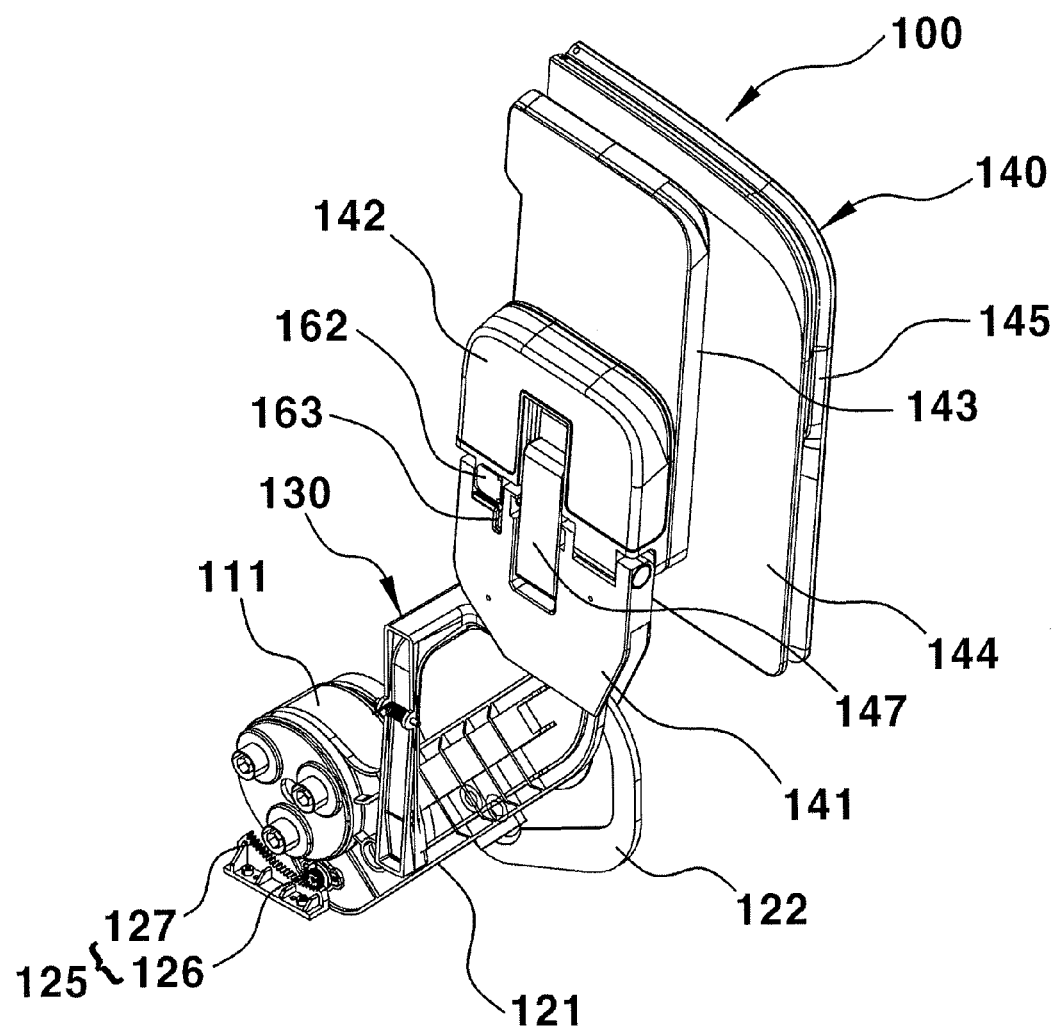
Figure 6B:
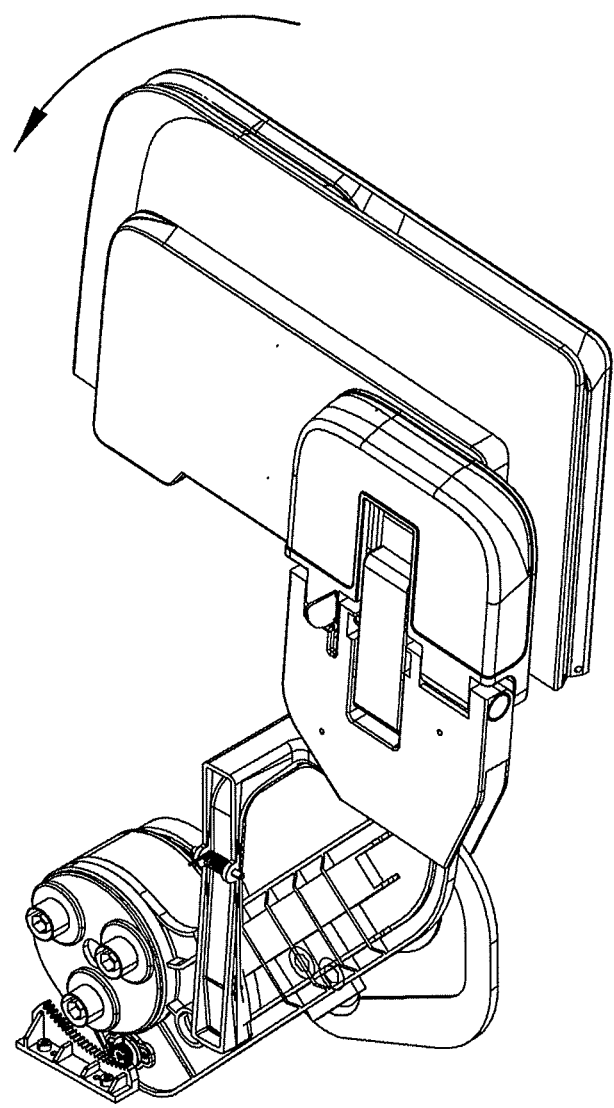
Figure 6C:
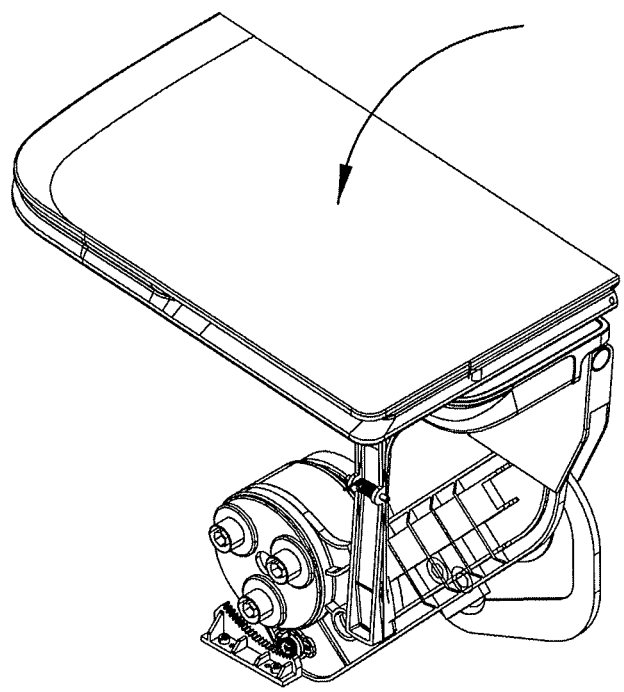
Figure 6D:
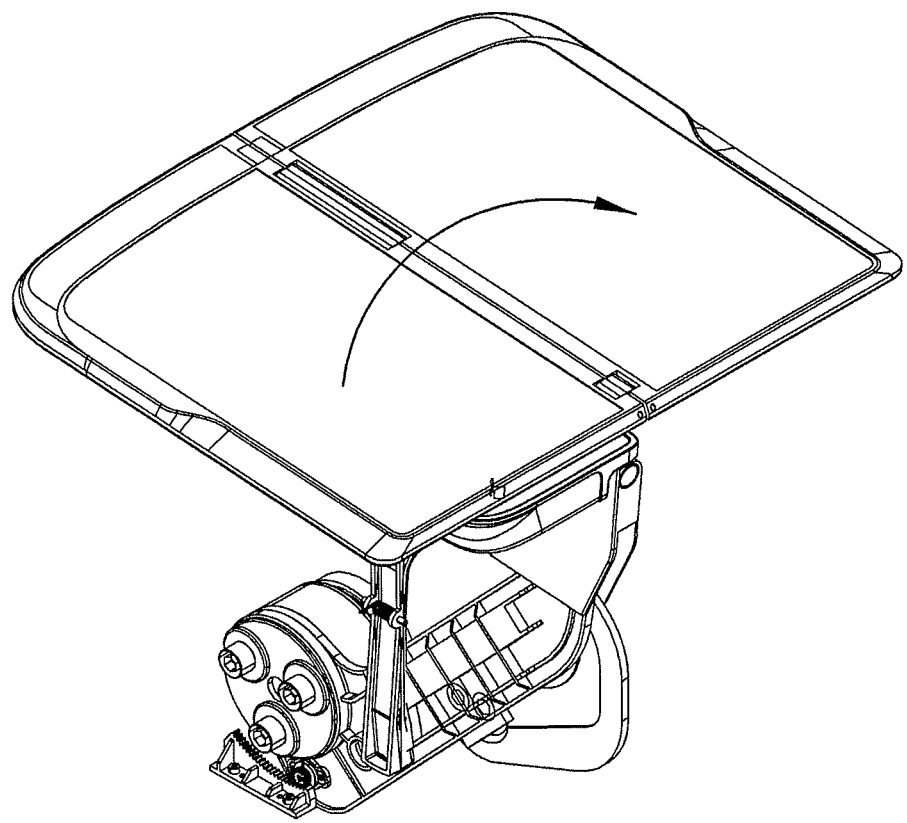

Thereafter, the intermediate support plate 143 is rotated with respect to the second base plate 142 and laid horizontally, as exemplarily shown in FIGS. 5B and 6B, and the second base plate 142 is folded at an angle of 90° with respect to the vertically erected first base plate 141, as exemplarily shown in FIGS. 5C and 6C.

That is, the second base plate 142, the intermediate support plate 143 and the table plates 144 and 145 are folded downwards so as to reach the horizontal state (e.g., folding of the table 140 to the horizontal position). Thereafter, the second table plate 145 is rotated and is spread so as to be coplanar with the first table plate 144.

Accordingly, the first table plate 144 and the second table plate 145 become the horizontal state and provide the coplanar surface of the table 140 and the passenger on the rear seat may place an article on the surface of the table 140.

In the above-described developed state of the table 140, the direction and position of the table 140 may be adjusted by rotating the intermediate support plate 143 or sliding the first table plate 14, as exemplarily shown in FIGS. 7 and 12.

On the other hand, if the table 140 is not used, the table 140 is received again within the console housing 2. The table 140 may be folded and received in the console housing 2 by executing the above-described development process in reverse order.

As is apparent from the above description, a foldable table assembly for vehicles in accordance with the present invention may execute sliding and rotation of a table, adjust the position and direction of the table, and be conveniently used by passengers seated on left and right regions of a rear seat of a vehicle.

Further, since the position and direction of the table may be adjusted, peripheral convenience devices, such as a switch of an operation panel, may be conveniently used without interference or obstruction of the table regardless of the positions of the passengers seated on the left and right regions of the rear seat.

Further, since the table may be stopped at a predetermined angle and, only if force of a designated load or more is applied to the table, the stop of the table may be released and the table may be rotated, the table in the stopped state may be more stably used and it is possible to prevent the passenger's chest from being injured by the rotating table during collision.

Further, since, if force of a designated load or more is applied to the table, the table may be rotated, a passenger may be prevented from being injured by impact caused by collision of the passenger's body with the table.

For convenience in explanation and accurate definition in the appended claims, the terms "lower" or "upper", "vertical" or "horizontal", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A foldable table assembly for vehicles, comprising:
    a base bracket;
    a first rotary arm provided with one end connected with the base bracket to be rotatable, and to be elastically rotated upwards about the end thereof by a first elastic member;
    a second rotary arm provided with one end hinged to the base bracket and to be rotated in accordance with rotation of the first rotary arm; and
    a table connected with and supported by the other ends of the first rotary arm and the second rotary arm and having table plates, usage position and direction of which are adjustable by a bearing member and sliding members when the table is popped up to a predetermined height by upward rotation of the first rotary arm and the second rotary arm,
    wherein the table includes base plates hinged to the other ends of the first rotary arm and the second rotary arm, an intermediate support plate connected with the base plate to be rotatable on the base plates when the bearing member is interposed therebetween, and the table plates connected with the intermediate support plate to be slidably movable on the intermediate support plate when the sliding members are interposed therebetween.

2. The foldable table assembly for vehicles of claim 1, wherein the base bracket is installed within a receiving space provided in a console housing of a rear seat console, and, as the first rotary arm is elastically rotated upwards about the end thereof connected with the base bracket by the first elastic member, the table protrudes upwards from the console housing to be usable.

3. The foldable table assembly for vehicles of claim 2, wherein a console armrest provided with one end hinged to the console housing to be rotatable, configured to open or close the receiving space through rotation, and closing the receiving space after pop-up of the table is installed.

4. The foldable table assembly for vehicles of claim 1, wherein the table plates include:
    a first table plate connected with the intermediate support plate to be slidable when the sliding members are interposed therebetween; and
    a second table plate coupled with the first table plate by a hinge member and rotated about the hinge member to overlap the first table plate to become a folded state or rotated about the hinge member in an opposite direction to be spread substantially coplanar with the first table plate to become an unfolded state.

5. The foldable table assembly for vehicles of claim 1, wherein the first elastic member is a spiral spring provided with one end connected with a spring fixing part of the base bracket and the other end connected with one end of the first rotary arm.

6. The foldable table assembly for vehicles of claim 1, further comprising an operating lever configured to lock the first rotary arm in a downward rotated state and to release a locked state of the first rotary arm during user's operation to execute pop-up of the table.

7. The foldable table assembly for vehicles of claim 6, wherein the operating lever includes:
   a lever part extended in a vertical direction and hinged to an inner part of the console housing to be rotatable, a lower end of the lever part pressing a latch part of the first rotary arm to maintain the locked state of the first rotary arm;
   a push button switch part extended horizontally from an upper end of the lever part and configured to allow the lever part to rotate in a direction of releasing the locked state of the first rotary arm in response to the push button switch part pushed downwards to execute pop-up of the table; and
   a second elastic member installed at a hinge coupling part of the lever part and elastically rotating the lever part in a direction of locking the first rotary arm.

8. The foldable table assembly for vehicles of claim 1, further comprising a decelerator configured to adjust a pop-up velocity of the table, wherein the decelerator includes:
   a rotation gear installed on one side surface of the first rotary arm; and
   a guide gear installed on the base bracket, having an arc shape having a predetermined length, and rotated when the rotation gear is engaged with the guide gear.

9. The foldable table assembly for vehicles of claim 1, wherein the base plates include:
   a first base plate hinged to the other ends of the first rotary arm and the second rotary arm; and
   a second base plate hinged to the first base plate and rotatable with respect to the first base plate to be disposed horizontally for use of the table, the intermediate support plate being connected with the second base plate,
   wherein the second base plate disposed horizontally on the erected first base plate connected with the first rotary arm and the second rotary arm is supported by a support member connected between the first base plate and the second base plate.

10. The foldable table assembly for vehicles of claim 9, wherein a locking device configured to prevent reverse rotation of the first rotary arm and the second rotary arm downwards after pop-up of the table is provided on the base plate to lock the second rotary arm in the pop-up state of the table, the locking device including:
   a stopper installed on the first base plate to be rotatable and supporting the other end of the second rotary arm to prevent reverse rotation of the second rotary arm when the stopper is engaged with the other end of the second rotary arm rotated upwards to a pop-up position of the table; and
   a locking fin configured to fix rotation of the stopper supporting the other end of the second rotary arm.

11. The foldable table assembly for vehicles of claim 10, wherein one end of the stopper is hinged to the first base plate to be rotatable and a third elastic member to rotate the stopper in a direction of releasing locking of the second rotary arm is installed between the other end of the stopper and the first base plate.

12. The foldable table assembly for vehicles of claim 10, wherein:
   the locking fin to automatically fix rotation of the stopper when the second base plate is rotated to be disposed horizontally is installed on the second base plate;
   an insertion hole to allow the locking fin to pass and protrude from a surface of the first base plate provided with the stopper installed thereon is formed on the first base plate; and
   the locking fin passing through the insertion hole and protruding from the first base plate is locked with the stopper fixing the other end of the second rotary arm to fix rotation of the stopper.

13. The foldable table assembly for vehicles of claim 1, wherein:
   a rotation regulation plate is installed on the intermediate support plate to be rotated integrally with the intermediate support plate;
   a regulation unit connected with the rotation regulation plate is installed on the base plate; and
   the regulation unit regulates rotation of the intermediate support plate per predetermined angle through the rotation regulation plate to stop the intermediate plate at the predetermined angle after rotation.

14. The foldable table assembly for vehicles of claim 13, wherein:
   the regulation unit is configured to release the stop of the intermediate plate if force equal to or more than a predetermined load in a rotating direction is applied to the intermediate plate;
   the regulation unit includes a ball housing formed on the second base plate and a ball elastically supported by a spring in the ball housing to be elastically protruded from the ball housing; and
   recesses, into which at least a part of the ball protruding from the ball housing is inserted, are formed along a circumference of the rotation regulation plate by predetermined intervals.

15. The foldable table assembly for vehicles of claim 14, wherein protrusions protruding from the rotation regulation plate and caught by the ball housing to regulate a maximally rotated position of the intermediate support plate are formed at the circumference of the rotation regulation plate.

16. The foldable table assembly for vehicles of claim 15, wherein two protrusions protruding from the rotation regulation plate and separated by a predetermined length in a circumferential direction are formed at the circumference of the rotation regulation plate.

* * * * *